US009530282B2

(12) United States Patent
Graboyes Goldman et al.

(10) Patent No.: US 9,530,282 B2
(45) Date of Patent: Dec. 27, 2016

(54) VIDEO GAME GAMING SYSTEM

(71) Applicant: GAMECO, INC., Upper Black Eddy, PA (US)

(72) Inventors: Blaine Joshua Graboyes Goldman, Upper Black Eddy, PA (US); Mark Sinosich, Sydney (AU); Mark C. Nicely, Daly City, CA (US)

(73) Assignee: GAMECO, INC., Upper Black Eddy, PA (US)

( * ) Notice: Subject to any disclaimer, the term of this patent is extended or adjusted under 35 U.S.C. 154(b) by 0 days.

(21) Appl. No.: 15/155,969

(22) Filed: May 16, 2016

(65) Prior Publication Data

US 2016/0343211 A1 Nov. 24, 2016

Related U.S. Application Data

(60) Provisional application No. 62/163,179, filed on May 18, 2015.

(51) Int. Cl.
*G06F 17/00* (2006.01)
*G06F 19/00* (2011.01)
*G07F 17/32* (2006.01)

(52) U.S. Cl.
CPC ....... *G07F 17/3262* (2013.01); *G07F 17/3244* (2013.01); *G07F 17/3295* (2013.01); *G07F 17/326* (2013.01)

(58) Field of Classification Search
CPC .................................................. G07F 17/3295
See application file for complete search history.

(56) References Cited

U.S. PATENT DOCUMENTS 5,570,885 A 11/1996 Ornstein
6,159,095 A 12/2000 Frohm et al.
6,165,070 A 12/2000 Nolte et al.
6,524,184 B1 2/2003 Lind et al.
6,935,946 B2 8/2005 Yoseloff et al.
(Continued)

FOREIGN PATENT DOCUMENTS

EP 1783707 A1 5/2007

OTHER PUBLICATIONS

PCT/US2016/032742 International Search Report and Written Opinion dated Jul. 27, 2016.

*Primary Examiner* — Steven J Hylinski
(74) *Attorney, Agent, or Firm* — Wilson, Sonsini, Goodrich & Rosati

(57) ABSTRACT

Described are methods, systems, and media for adapting single player games of skill to a gaming environment. This game gaming comprises: accepting, through the gaming machine, initiation of play by a player; providing one or more games of video game skill, wherein a Playfield is chosen from a Playfield Selection Pool wherein the Playfield is set to have a Maximum Available Payout and games are chosen from that Playfield; evaluating and recording the results of the play of the said game session in the said Playfield; presenting a Paytable to the player, wherein the Paytable comprises one or more lines of payouts based on a player's play results; evaluating and distributing any payout earned according to the best play results and the Paytable; and managing the variance of Return To Player (RTP) of the Paytable, by adjusting selection weights of different Playfields presented to a player.

24 Claims, 24 Drawing Sheets

(56) References Cited

U.S. PATENT DOCUMENTS

| | | | | |
|---|---|---|---|---|
| 7,874,919 | B2 | 1/2011 | Paulsen et al. | |
| 7,922,575 | B2 | 4/2011 | Jankowski | |
| 7,927,204 | B2 | 4/2011 | Debrabander et al. | |
| 8,192,270 | B2 | 6/2012 | Slomiany et al. | |
| 8,337,309 | B2 | 12/2012 | Okuniewicz | |
| 8,485,877 | B2 | 7/2013 | Saks | |
| 8,734,230 | B2 | 5/2014 | Yoseloff | |
| 8,968,079 | B2 | 3/2015 | Kennedy | |
| 8,986,105 | B2 | 3/2015 | Okuniewicz | |
| 8,998,707 | B2 | 4/2015 | Arnone et al. | |
| 9,336,656 | B2 * | 5/2016 | Arnone | G07F 17/32 |
| 2008/0081689 | A1 | 4/2008 | Seelig et al. | |
| 2011/0009178 | A1 * | 1/2011 | Gerson | G07F 17/32 463/17 |
| 2011/0212766 | A1 * | 9/2011 | Bowers | G07F 17/32 463/25 |
| 2011/0218035 | A1 * | 9/2011 | Thomas | G07F 17/32 463/25 |
| 2013/0131848 | A1 * | 5/2013 | Arnone | G07F 17/3244 700/91 |
| 2013/0237326 | A1 | 9/2013 | Arnone et al. | |
| 2013/0252718 | A1 | 9/2013 | Arnone et al. | |
| 2013/0281171 | A1 * | 10/2013 | Ramsour | G07F 17/3295 463/10 |
| 2014/0073405 | A1 | 3/2014 | Arnone et al. | |
| 2014/0087808 | A1 | 3/2014 | Basallo et al. | |
| 2014/0141863 | A1 | 5/2014 | Arnone et al. | |
| 2014/0228083 | A1 | 8/2014 | Arnone et al. | |
| 2014/0378219 | A1 | 12/2014 | Arnone et al. | |
| 2015/0080074 | A1 * | 3/2015 | Arnone | G07F 17/3223 463/9 |
| 2015/0111632 | A1 | 4/2015 | Meyer | |

* cited by examiner

Fig. 3

| PAYOUT BASED ON WAGER OF 1 CREDIT | | | | |
|---|---|---|---|---|
| Distribution | Min. (Secs) | Max. (Secs) | Payline | Payout |
| 1 | 0.0 | 14.00 | ≤ 14.00 | 3.0 |
| 2 | 14.01 | 14.05 | ≤ 14.05 | 2.0 |
| 3 | 14.06 | 14.10 | ≤ 14.10 | 1.0 |
| 4 | 14.10 | 14.20 | ≤ 14.20 | 0.5 |
| 5 | 14.21 | 60.00 | > 14.20 | 0.0 |

Fig. 4

| Distribution | Payline | Chance | Payout | RTP |
|---|---|---|---|---|
| 1 | ≤ 14.00 | 5% | 3 | 15% |
| 2 | ≤ 14.05 | 10% | 2 | 20% |
| 3 | ≤ 14.10 | 25% | 1 | 25% |
| 4 | ≤ 14.20 | 30% | 0.5 | 15% |
| 5 | > 14.20 | 30% | 0 | 0% |
| TOTAL | | 100% | | 75% |

| 75% RTP WEIGHTING | | | | |
|---|---|---|---|---|
| Distribution | Payline | Chance | Payout | RTP |
| 1 | ≤ 14.00 | 5% | 3 | 15% |
| 2 | ≤ 14.05 | 10% | 2 | 20% |
| 3 | ≤ 14.10 | 25% | 1 | 25% |
| 4 | ≤ 14.20 | 30% | 0.5 | 15% |
| 5 | > 14.20 | 30% | 0 | 0% |
| TOTAL | | 100% | | 75% |

| 85% RTP WEIGHTING | | | | |
|---|---|---|---|---|
| Distribution | Payline | Chance | Payout | RTP |
| 1 | ≤ 14.00 | 5% | 3 | 15% |
| 2 | ≤ 14.05 | 15% | 2 | 30% |
| 3 | ≤ 14.10 | 25% | 1 | 25% |
| 4 | ≤ 14.20 | 30% | 0.5 | 15% |
| 5 | > 14.20 | 25% | 0 | 0% |
| TOTAL | | 100% | | 85% |

| 90% RTP WEIGHTING | | | | |
|---|---|---|---|---|
| Distribution | Payline | Chance | Payout | RTP |
| 1 | ≤ 14.00 | 5% | 3 | 15% |
| 2 | ≤ 14.05 | 15% | 2 | 30% |
| 3 | ≤ 14.10 | 30% | 1 | 30% |
| 4 | ≤ 14.20 | 30% | 0.5 | 15% |
| 5 | > 14.20 | 20% | 0 | 0% |
| TOTAL | | 100% | | 90% |

Fig. 9

| Track Symbol Key | Track Symbol Name | | | | | | |
|---|---|---|---|---|---|---|---|
| S | Start | Sum | 0 | 0 | 0 | 0 | 0 |
| | | | 0 | 0 | 0 | 0 | 0 |
| F | Finish | Sum | 0 | 0 | 0 | 0 | 0 |
| | | | 0 | 0 | 0 | 0 | 0 |
| A | Straight | Sum | 1 | 1 | 1 | 1 | 1 |
| | | | 1 | 1 | 1 | 1 | 1 |
| L | Left Corner | Sum | 1 | 2 | 3 | 4 | 5 |
| | | | 0 | 0 | 0 | 0 | 1 |
| | | | 0 | 0 | 0 | 1 | 1 |
| | | | 0 | 0 | 1 | 1 | 1 |
| | | | 0 | 1 | 1 | 1 | 1 |
| | | | 1 | 1 | 1 | 1 | 1 |
| R | Right Corner | Sum | 5 | 4 | 3 | 2 | 1 |
| | | | 1 | 0 | 0 | 0 | 0 |
| | | | 1 | 1 | 0 | 0 | 0 |
| | | | 1 | 1 | 1 | 0 | 0 |
| | | | 1 | 1 | 1 | 1 | 0 |
| | | | 1 | 1 | 1 | 1 | 1 |

Fig. 10

| Track Name | Dstrbn Name | Optimal Time | | | | | | | | | | | | | | | | |
|---|---|---|---|---|---|---|---|---|---|---|---|---|---|---|---|---|---|---|
| 1 | 1 | 14.00 | Symbol | S | A | R | R | A | | | A | R | | A | | R | A | F |
| | | | Repeat | 1 | 1000 | 1 | 1 | 150 | 1 | 1 | 125 | 1 | 1 | 50 | 1 | 1 | 51 | 1 |
| | | | Time Column 1 | 0 | 1000 | 5 | 5 | 150 | 1 | 1 | 125 | 5 | 1 | 50 | 1 | 5 | 51 | 0 |
| | | | Time Column 2 | 0 | 1000 | 4 | 4 | 150 | 2 | 2 | 125 | 4 | 2 | 50 | 2 | 4 | 51 | 0 |
| | | | Time Column 3 | 0 | 1000 | 3 | 3 | 150 | 3 | 3 | 125 | 3 | 3 | 50 | 3 | 3 | 51 | 0 |
| | | | Time Column 4 | 0 | 1000 | 2 | 2 | 150 | 4 | 4 | 125 | 2 | 4 | 50 | 4 | 2 | 51 | 0 |
| | | | Time Column 5 | 0 | 1000 | 1 | 1 | 150 | 5 | 5 | 125 | 1 | 5 | 50 | 5 | 1 | 51 | 0 |

Fig. 11

| Track Name | Dstrbn Name | Optimal Time | | | | | | | | | | | | | | | | |
|---|---|---|---|---|---|---|---|---|---|---|---|---|---|---|---|---|---|---|
| 2 | 2 | 14.01 | Symbol | S | A | R | R | A | | | A | R | | A | | R | A | F |
| | | | Repeat | 1 | 1000 | 1 | 1 | 150 | 1 | 1 | 125 | 1 | 1 | 50 | 1 | 1 | 52 | 1 |
| | | | Time Column 1 | 0 | 1000 | 5 | 5 | 150 | 1 | 1 | 125 | 5 | 1 | 50 | 1 | 5 | 52 | 0 |
| | | | Time Column 2 | 0 | 1000 | 4 | 4 | 150 | 2 | 2 | 125 | 4 | 2 | 50 | 2 | 4 | 52 | 0 |
| | | | Time Column 3 | 0 | 1000 | 3 | 3 | 150 | 3 | 3 | 125 | 3 | 3 | 50 | 3 | 3 | 52 | 0 |
| | | | Time Column 4 | 0 | 1000 | 2 | 2 | 150 | 4 | 4 | 125 | 2 | 4 | 50 | 4 | 2 | 52 | 0 |
| | | | Time Column 5 | 0 | 1000 | 1 | 1 | 150 | 5 | 5 | 125 | 1 | 5 | 50 | 5 | 1 | 52 | 0 |

Fig. 12

| Track Name | Dstrbn Name | Optimal Time | | | | | | | | | | | | | | | | |
|---|---|---|---|---|---|---|---|---|---|---|---|---|---|---|---|---|---|---|
| 3 | 3 | 14.06 | Symbol | S | A | R | R | A | | | A | R | | A | | R | A | F |
| | | | Repeat | 1 | 1000 | 1 | 1 | 150 | 1 | 1 | 125 | 1 | 1 | 50 | 1 | 1 | 57 | 1 |
| | | | Time Column 1 | 0 | 1000 | 5 | 5 | 150 | 1 | 1 | 125 | 5 | 1 | 50 | 1 | 5 | 57 | 0 |
| | | | Time Column 2 | 0 | 1000 | 4 | 4 | 150 | 2 | 2 | 125 | 4 | 2 | 50 | 2 | 4 | 57 | 0 |
| | | | Time Column 3 | 0 | 1000 | 3 | 3 | 150 | 3 | 3 | 125 | 3 | 3 | 50 | 3 | 3 | 57 | 0 |
| | | | Time Column 4 | 0 | 1000 | 2 | 2 | 150 | 4 | 4 | 125 | 2 | 4 | 50 | 4 | 2 | 57 | 0 |
| | | | Time Column 5 | 0 | 1000 | 1 | 1 | 150 | 5 | 5 | 125 | 1 | 5 | 50 | 5 | 1 | 57 | 0 |

Fig. 13

| Track Name | Dstrbn Name | Optimal Time | | | | | | | | | | | | | | | | |
|---|---|---|---|---|---|---|---|---|---|---|---|---|---|---|---|---|---|---|
| 4 | 4 | 14.11 | Symbol | S | A | R | R | A | | | A | R | | A | | R | A | F |
| | | | Repeat | 1 | 1000 | 1 | 1 | 150 | 1 | 1 | 125 | 1 | 1 | 50 | 1 | 1 | 62 | 1 |
| | | | Time Column 1 | 0 | 1000 | 5 | 5 | 150 | 1 | 1 | 125 | 5 | 1 | 50 | 1 | 5 | 62 | 0 |
| | | | Time Column 2 | 0 | 1000 | 4 | 4 | 150 | 2 | 2 | 125 | 4 | 2 | 50 | 2 | 4 | 62 | 0 |
| | | | Time Column 3 | 0 | 1000 | 3 | 3 | 150 | 3 | 3 | 125 | 3 | 3 | 50 | 3 | 3 | 62 | 0 |
| | | | Time Column 4 | 0 | 1000 | 2 | 2 | 150 | 4 | 4 | 125 | 2 | 4 | 50 | 4 | 2 | 62 | 0 |
| | | | Time Column 5 | 0 | 1000 | 1 | 1 | 150 | 5 | 5 | 125 | 1 | 5 | 50 | 5 | 1 | 62 | 0 |

Fig. 14

| Track Name | Dstrbn. Name | Optimal Time | | | | | | | | | | | | | | | | |
|---|---|---|---|---|---|---|---|---|---|---|---|---|---|---|---|---|---|---|
| 5 | 5 | 14.21 | **Symbol** | **S** | **A** | **R** | **R** | **A** | | | **A** | **R** | | **A** | | **R** | **A** | **F** |
| | | | Repeat | 1 | 1000 | 1 | 1 | 150 | 1 | 1 | 125 | 1 | 1 | 50 | 1 | 1 | 72 | 1 |
| | | | Time Column 1 | 0 | 1000 | 5 | 5 | 150 | 1 | 1 | 125 | 5 | 1 | 50 | 1 | 5 | 72 | 0 |
| | | | Time Column 2 | 0 | 1000 | 4 | 4 | 150 | 2 | 2 | 125 | 4 | 2 | 50 | 2 | 4 | 72 | 0 |
| | | | Time Column 3 | 0 | 1000 | 3 | 3 | 150 | 3 | 3 | 125 | 3 | 3 | 50 | 3 | 3 | 72 | 0 |
| | | | Time Column 4 | 0 | 1000 | 2 | 2 | 150 | 4 | 4 | 125 | 2 | 4 | 50 | 4 | 2 | 72 | 0 |
| | | | Time Column 5 | 0 | 1000 | 1 | 1 | 150 | 5 | 5 | 125 | 1 | 5 | 50 | 5 | 1 | 72 | 0 |

Fig. 15

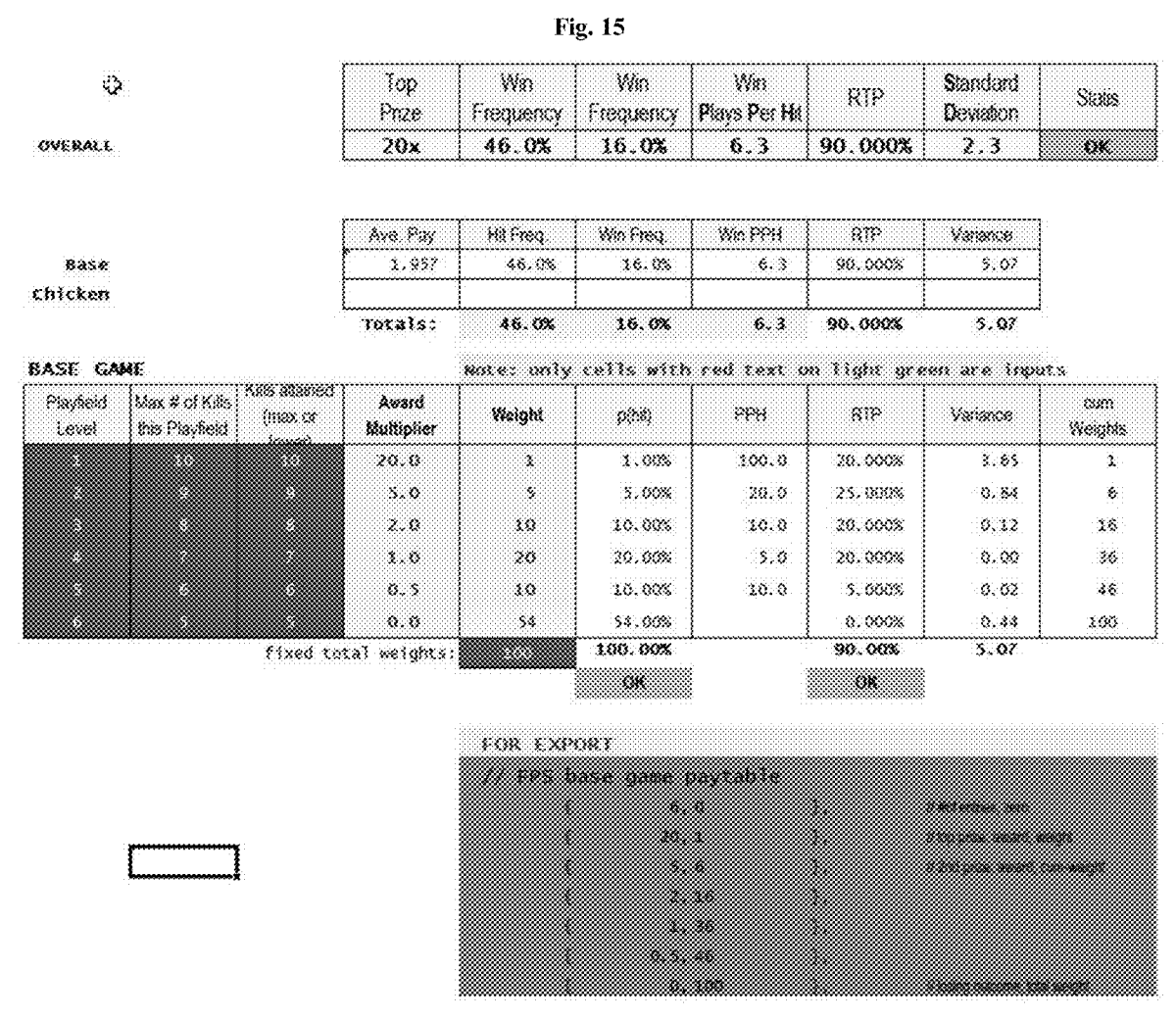

| | Top Prize | Win Frequency | Win Frequency | Win Plays Per Hit | RTP | Standard Deviation | Stats |
|---|---|---|---|---|---|---|---|
| OVERALL | 20x | 46.0% | 16.0% | 6.3 | 90.000% | 2.3 | OK |

| | Ave. Pay | Hit Freq. | Win Freq. | Win PPH | RTP | Variance |
|---|---|---|---|---|---|---|
| Base | 1.957 | 46.0% | 16.0% | 6.3 | 90.000% | 5.07 |
| Chicken | | | | | | |
| | Totals: | 46.0% | 16.0% | 6.3 | 90.000% | 5.07 |

BASE GAME

Note: only cells with red text on light green are inputs

| Playfield Level | Max # of Kills this Playfield | Kills attained (max or lower) | Award Multiplier | Weight | p(hit) | PPH | RTP | Variance | cum Weights |
|---|---|---|---|---|---|---|---|---|---|
| 1 | 10 | 10 | 20.0 | 1 | 1.00% | 100.0 | 20.000% | 3.65 | 1 |
| 2 | 9 | 9 | 5.0 | 5 | 5.00% | 20.0 | 25.000% | 0.84 | 6 |
| 3 | 8 | 8 | 2.0 | 10 | 10.00% | 10.0 | 20.000% | 0.12 | 16 |
| 4 | 7 | 7 | 1.0 | 20 | 20.00% | 5.0 | 20.000% | 0.00 | 36 |
| 5 | 6 | 6 | 0.5 | 10 | 10.00% | 10.0 | 5.000% | 0.02 | 46 |
| 6 | 5 | 5 | 0.0 | 54 | 54.00% | | 0.000% | 0.44 | 100 |
| | | | fixed total weights: | 100 | 100.00% | | 90.00% | 5.07 | |
| | | | | | OK | | OK | | |

FOR EXPORT

```
// FPS base game paytable
{ 0, 0 },
{ 20, 1 },
{ 5, 6 },
{ 2, 16 },
{ 1, 36 },
{ 0.5, 46 },
{ 0, 100 },
```

Fig. 16

Chicken Dinner payout control

The primary inputs for this model are:

* $ PRIZE and weight of each Chicken award
* multiplier and weight of each Base award
* Target overall RTP Chicken Dinner event frequency is a result, not an input.

CHICKEN DINNER payouts wager size: $1

| Award ID | Cash Prize for Specific Bet | Weight | Award Multiplier | p(hit) | PPH | cummulative PPH | inv. cum PPH | Value | Payout Proportion | Variance | cum Weights |
|---|---|---|---|---|---|---|---|---|---|---|---|
| 1 | $25 | 1 | 25.0x | 0.50% | 200.0 | 1.0 | | 0.125 | 1.92% | 2.90 | 1 |
| 2 | $10 | 56 | 10.0x | 28.00% | 3.6 | 1.0 | 3.5 | 2.800 | 43.08% | 23.19 | 57 |
| 3 | $7 | 42 | 7.0x | 21.00% | 4.8 | 1.4 | 2.0 | 1.470 | 22.62% | 7.81 | 99 |
| 4 | $5 | 59 | 5.0x | 29.50% | 3.4 | 2.0 | 1.3 | 1.475 | 22.69% | 4.96 | 158 |
| 5 | $3 | 42 | 3.0x | 21.00% | 4.8 | 4.8 | 1.0 | 0.630 | 9.69% | 0.93 | 200 |
| | fixed total weights | 200 | | 100.00% | | | | 6.500 | 100.00% | 39.79 | |

OK

3/65 Chicken Dinner triggering odds 4.62% 21.6666667

FOR EXPORT

```
// $1 Chicken paytable
{ 1, 0 },
{ 25, 1 },
{ 10, 57 },
{ 7, 99 },
{ 5, 158 },
{ 3, 200 },
```

Fig. 17

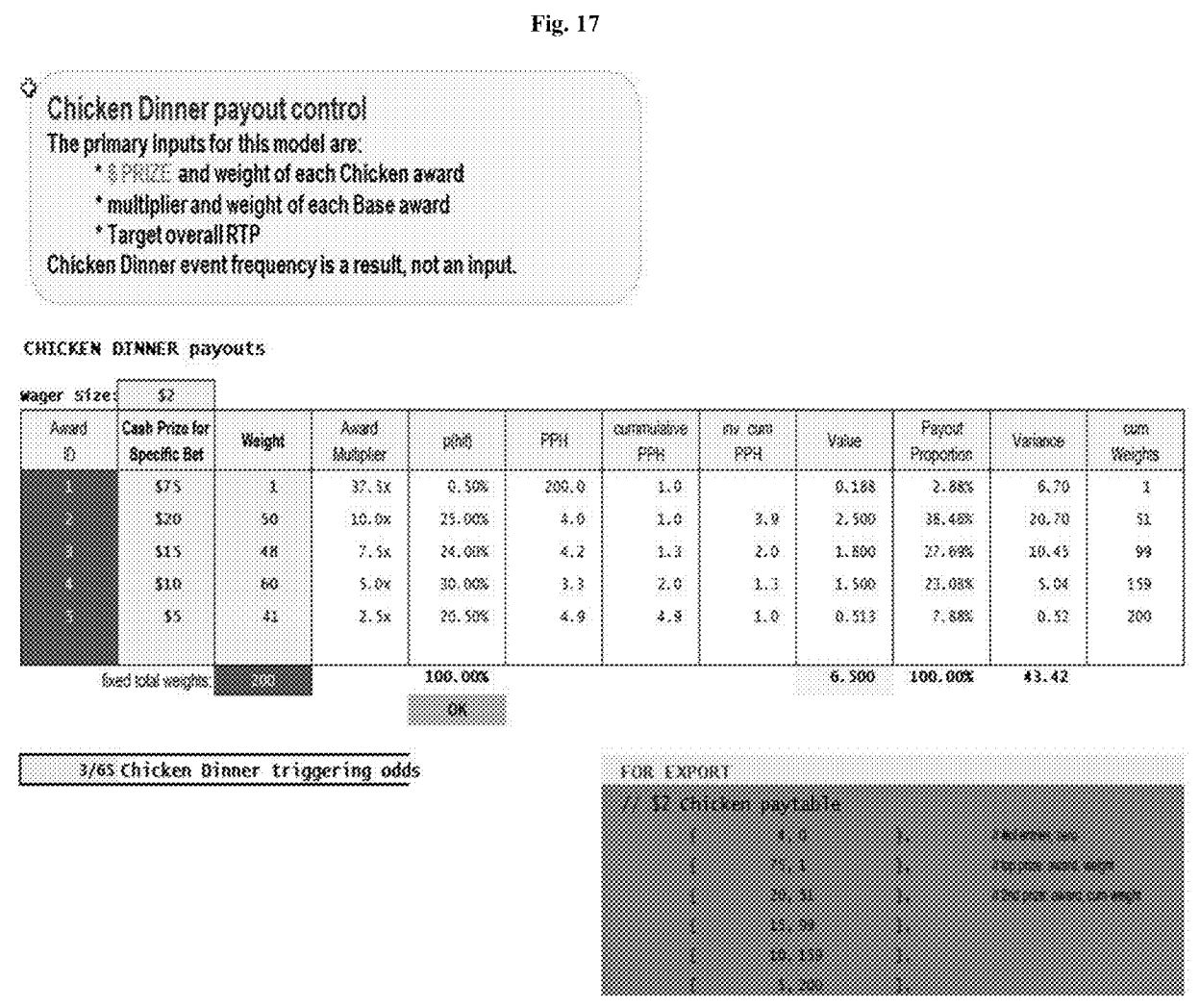

Chicken Dinner payout control

The primary inputs for this model are:

- $ PRIZE and weight of each Chicken award
- multiplier and weight of each Base award
- Target overall RTP Chicken Dinner event frequency is a result, not an input.

CHICKEN DINNER payouts wager size: $2

| Award ID | Cash Prize for Specific Bet | Weight | Award Multiplier | p(hit) | PPH | cummulative PPH | inv. cum PPH | Value | Payout Proportion | Variance | cum Weights |
|---|---|---|---|---|---|---|---|---|---|---|---|
| 1 | $75 | 1 | 37.5x | 0.50% | 200.0 | 1.0 | | 0.188 | 2.88% | 6.70 | 1 |
| 2 | $20 | 50 | 10.0x | 25.00% | 4.0 | 1.0 | 3.9 | 2.500 | 38.46% | 20.70 | 51 |
| 3 | $15 | 48 | 7.5x | 24.00% | 4.2 | 1.3 | 2.0 | 1.800 | 27.69% | 10.45 | 99 |
| 4 | $10 | 60 | 5.0x | 30.00% | 3.3 | 2.0 | 1.3 | 1.500 | 23.08% | 5.04 | 159 |
| 5 | $5 | 41 | 2.5x | 20.50% | 4.9 | 4.9 | 1.0 | 0.513 | 7.88% | 0.52 | 200 |
| | fixed total weights: | [illegible] | | 100.00% | | | | 6.500 | 100.00% | 43.42 | |

OK

3/65 Chicken Dinner triggering odds

FOR EXPORT

```
// $2 Chicken paytable
{ 4, 0 },
{ 75, 1 },
{ 20, 51 },
{ 15, 99 },
{ 10, 159 },
{ 5, 200 },
```

Fig. 18

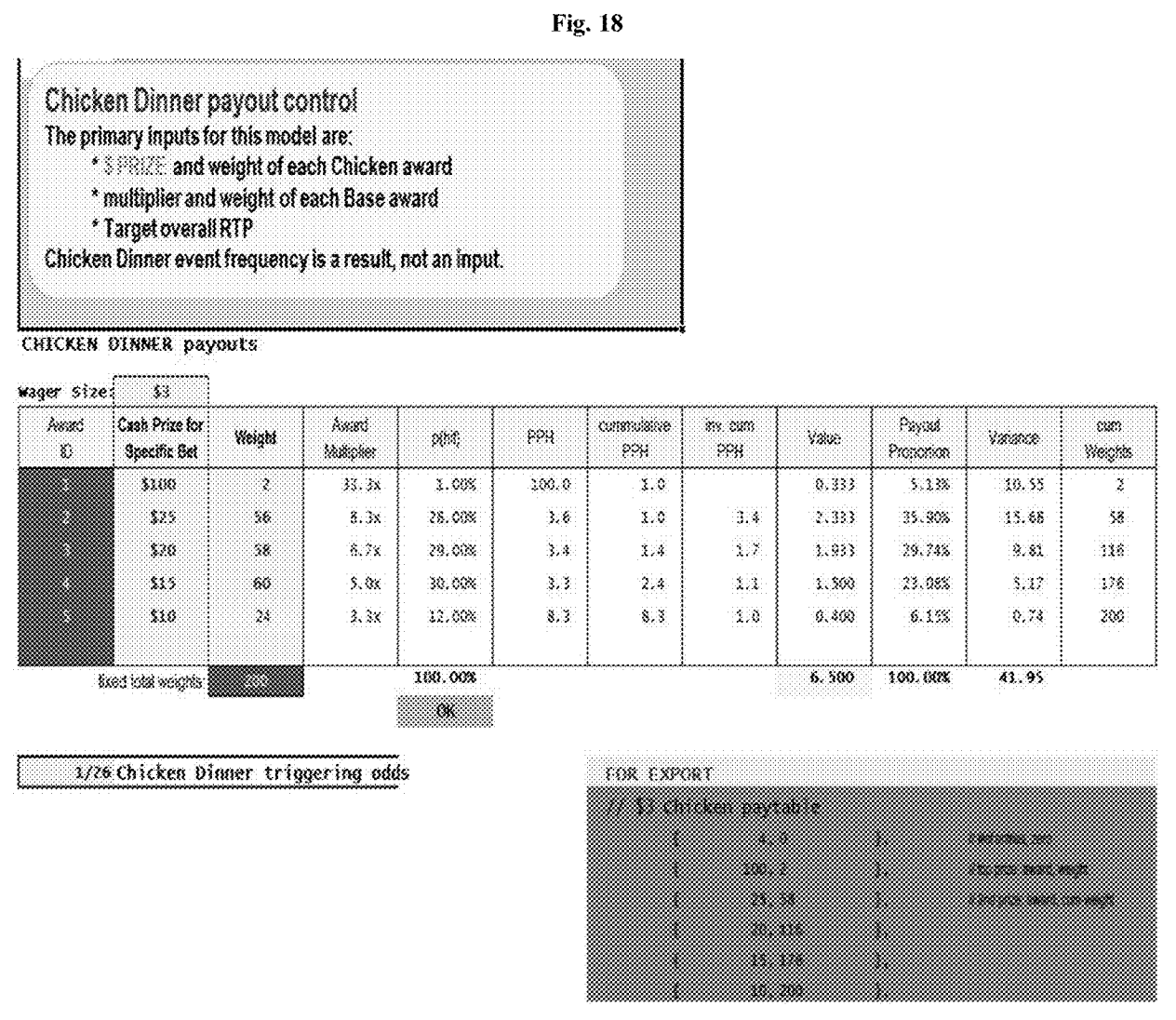

Chicken Dinner payout control

The primary inputs for this model are:

* $ PRIZE and weight of each Chicken award
* multiplier and weight of each Base award
* Target overall RTP Chicken Dinner event frequency is a result, not an input.

CHICKEN DINNER payouts wager size: $3

| Award ID | Cash Prize for Specific Bet | Weight | Award Multiplier | p(hit) | PPH | cumulative PPH | inv. cum PPH | Value | Payout Proportion | Variance | cum Weights |
|---|---|---|---|---|---|---|---|---|---|---|---|
| 1 | $100 | 2 | 33.3x | 1.00% | 100.0 | 1.0 | | 0.333 | 5.13% | 10.55 | 2 |
| 2 | $25 | 56 | 8.3x | 28.00% | 3.6 | 1.0 | 3.4 | 2.333 | 35.90% | 15.68 | 58 |
| 3 | $20 | 58 | 6.7x | 29.00% | 3.4 | 1.4 | 1.7 | 1.933 | 29.74% | 9.81 | 116 |
| 4 | $15 | 60 | 5.0x | 30.00% | 3.3 | 2.4 | 1.1 | 1.500 | 23.08% | 5.17 | 176 |
| 5 | $10 | 24 | 3.3x | 12.00% | 8.3 | 8.3 | 1.0 | 0.400 | 6.15% | 0.74 | 200 |
| | fixed total weights | 200 | | 100.00% | | | | 6.500 | 100.00% | 41.95 | |

OK

1/26 Chicken Dinner triggering odds

FOR EXPORT

```
// $3 Chicken paytable
{ 4, 0 },
{ 100, 2 },
{ 25, 58 },
{ 20, 118 },
{ 15, 178 },
{ 10, 200 },
```

Fig. 19

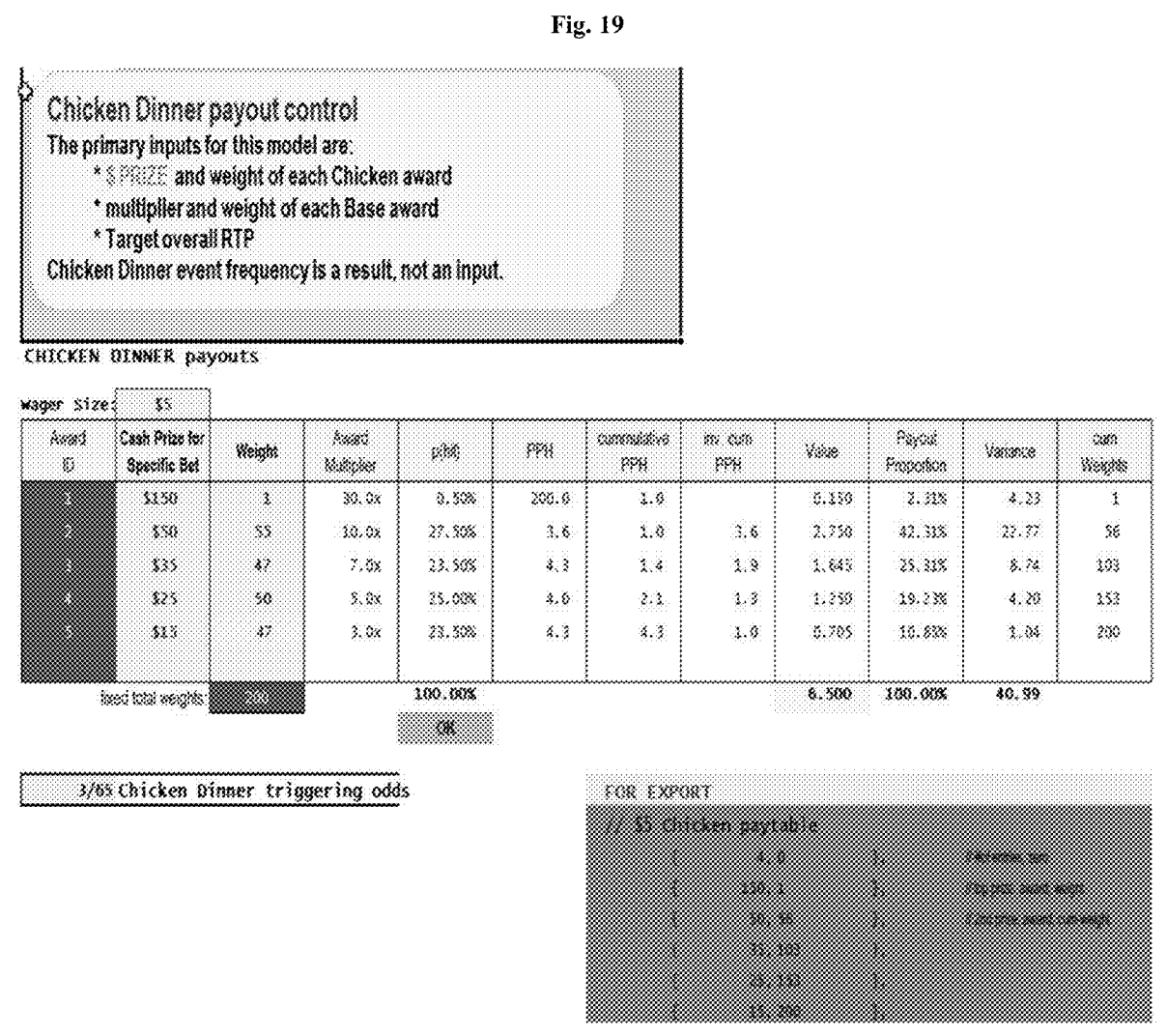

Chicken Dinner payout control

The primary inputs for this model are:

* $ PRIZE and weight of each Chicken award
* multiplier and weight of each Base award
* Target overall RTP Chicken Dinner event frequency is a result, not an input.

CHICKEN DINNER payouts wager size: $5

| Award ID | Cash Prize for Specific Bet | Weight | Award Multiplier | p(hit) | FPH | cummulative FPH | inv. cum FPH | Value | Payout Proportion | Variance | cum Weights |
|---|---|---|---|---|---|---|---|---|---|---|---|
| 1 | $150 | 1 | 30.0x | 0.50% | 200.0 | 1.0 | | 0.150 | 2.31% | 4.23 | 1 |
| 2 | $50 | 55 | 10.0x | 27.50% | 3.6 | 1.0 | 3.6 | 2.750 | 42.31% | 22.77 | 56 |
| 3 | $35 | 47 | 7.0x | 23.50% | 4.3 | 1.4 | 1.9 | 1.645 | 25.31% | 8.74 | 103 |
| 4 | $25 | 50 | 5.0x | 25.00% | 4.0 | 2.1 | 1.3 | 1.250 | 19.23% | 4.20 | 153 |
| 5 | $15 | 47 | 3.0x | 23.50% | 4.3 | 4.3 | 1.0 | 0.705 | 10.85% | 1.04 | 200 |
| | fixed total weights | 200 | | 100.00% | | | | 6.500 | 100.00% | 40.99 | |
| | | | | OK | | | | | | | |

3/65 Chicken Dinner triggering odds

FOR EXPORT

```
// $5 Chicken paytable
{ 4.0 },
{ 150, 1 },
{ 50, 56 },
{ 35, 103 },
{ 25, 153 },
{ 15, 200 },
```

Fig. 20

Chicken Dinner payout control

The primary inputs for this model are:

* $PRIZE and weight of each Chicken award
* multiplier and weight of each Base award
* Target overall RTP Chicken Dinner event frequency is a result, not an input.

CHICKEN DINNER payouts wager size: $25

| Award ID | Cash Prize for Specific Bet | Weight | Award Multiplier | p(hit) | PPH | commulative PPH | inv cum PPH | Value | Payout Proportion | Variance | cum Weights |
|---|---|---|---|---|---|---|---|---|---|---|---|
| 1 | $750 | 1 | 30.0x | 0.50% | 200.0 | 1.0 | | 0.150 | 2.31% | 4.23 | 1 |
| 2 | $250 | 55 | 10.0x | 27.50% | 3.6 | 1.0 | 3.6 | 2.750 | 42.31% | 22.77 | 56 |
| 3 | $175 | 47 | 7.0x | 23.50% | 4.3 | 1.4 | 1.9 | 1.645 | 25.31% | 6.74 | 103 |
| 4 | $125 | 50 | 5.0x | 25.00% | 4.0 | 2.1 | 1.3 | 1.250 | 19.23% | 4.20 | 153 |
| 5 | $75 | 47 | 3.0x | 23.50% | 4.3 | 4.3 | 1.0 | 0.705 | 10.85% | 1.04 | 200 |
| | fixed total weights | 200 | | 100.00% | | | | 6.500 | 100.00% | 40.99 | |
| | | | | OK | | | | | | | |

3/65 Chicken Dinner triggering odds

5

FOR EXPORT

```
// $25 Chicken paytable
{ 4, 0 },
{ 750, 1 },
{ 250, 56 },
{ 175, 103 },
{ 125, 153 },
{ 75, 200 },
```

VIDEO GAME GAMING SYSTEM

CROSS-REFERENCE TO RELATED APPLICATIONS

This application claims the benefit of U.S. Provisional Application No. 62/163,179, filed May 18, 2015, which is incorporated herein by reference in its entirety.

BACKGROUND OF THE INVENTION

The majority (60%-75%) of U.S. casino revenue comes from slot machines; however, revenue from slot machines has been declining over the past decade. On the other hand, there are 112 million multiplayer gamers in the U.S. today. Video games generate $26 billion per year, rivaling a similar spend from fans of traditional sports. Casinos will benefit by offering new products that appeal to generations who've grown up playing video games.

Casinos are undergoing a crisis as revenue from slot machines continues to fall. Casinos are struggling to engage and retain a young audience. Most slot players are older (above 50), while young people (below 40) don't play slots as they grew up playing interactive video games. Traditional slot machine manufacturers are not keeping up with younger players' expectations for new games. Younger players who grew up playing video games spend much less time in casinos than the older players and are looking for a more engaging product beyond traditional reel slot machines.

The problem of retention of users of traditional gaming machines lies in that they are less interactive and are based on chance rather than skill, as interactive video games tend to be. Current technologies fail to incorporate younger players' interests in interactive games of skill with casino machines. In particular, existing technologies fail to directly combine a player's performance in a game of skill with the payout.

Therefore, there is a need to provide means to increase enjoyment and interactivity of gaming devices wherein player skill input has a clear and obvious effect on player payouts.

SUMMARY OF THE INVENTION

To increase enjoyment and interactivity of gaming devices, among other things, embodiments of the video game gaming machine (VGM) described herein may be played similarly to a traditional slot machine but with features allowing the player to have greater control over the outcome of the game while still providing desirable expected Return To Player (eRTP) values. In some embodiments, the VGM combines the feel of a traditional arcade cabinet with a slot machine with a unique player experience that brings a new element of skill to the casino floor.

Embodiments of the invention described herein provide various solutions to reinvigorate slot revenue and bring the next generation and a new audience to the casino with video game gaming. For example, one embodiment of the invention described herein is a VGM which facilitates gaming activities by employing popular video games on the casino floor. In some embodiments, the VGM is a single player experience that replaces traditional reel slot machines. In further embodiments, the VGM is a proprietary video game gaming machine which is configured to receive wagers from players betting against the house while competing in multiplayer video games. It is envisioned that the described VGM will ultimately increase revenues as compared with traditional slot machines, and would be more attractive to both a younger audience uninterested in traditional slot machines and an older audience seeking something new to play. The VGM of the invention provides many advantages, such as a dynamic game pace and engaging experience, and includes eSports gaming and related features, which is currently one of the fastest growing spectator sports. Some embodiments of the invention described herein provide players with games, gaming methods and a gaming experience which is relatively easy to play yet also challenging to master. It is envisioned that the VGM of the invention would also have widespread appeal amongst gamers who love video games, crossing over multiple popular game genres.

Some embodiments of the invention are directed to computer-implemented methods, computer-implemented systems, and non-transitory computer-readable storage media encoded with a computer program including instructions in code and data segments which are executable by a processor and upon execution thereof configured to provide a game of chance in the computerized environment, which may include one or more data communication and display devices, wherein the size and/or nature of the payout within a game session can be influenced by the application of skill by one or more players.

In some embodiments, differing levels of skill exhibited during game play yield different eRTP (expected Return To Player) without any payback compensation. In such embodiments, the game system design parameters may be adjusted by the processor to affect the level of skill required for any given player to avoid any particular level of payback loss.

In some other embodiments, the present invention is able to generate an aRTP (actual Return To Player) to be within a specific range of values over a specific number of games to within a specific confidence level by employing the means to: (a) select or construct a Playfield for a given game session whose Maximum Available Payout, based on the application of Optimal Skill, is less than the maximum possible payout listed in the corresponding Paytable; (b) increase payout during a game session based upon detection of the use of Sub-Optimal Skill.

In some embodiments, the payout is based on a Key Score with respect to a Paytable which defines specific payout for specific Key Score values. In some embodiments, no payout is awarded unless a certain minimum Key Score was attained. A Key Score whose value is large enough to warrant a payout is called a Qualifying Key Score. In some embodiments, there is a different payout for each different Qualifying Key Score. In some embodiments, at least two Qualifying Key Scores results in the same payout. In some embodiments, where the Key Score is larger than required to otherwise qualify for a payout, only the highest payout is awarded. For example, in the case of a game where the final result is "4 ducks" and whose Paytable is comprised of the prizes: (a) $5 prize for 5 ducks; (b) $2 prize for 4 ducks; and (c) $1 prize for 3 ducks; only the $2 prize will be awarded even though "3 ducks" is a subset of a "4 ducks" result.

In one aspect, disclosed herein is a computer-implemented method of adapting games of skill into a gaming machine, wherein the method balances player skill, game challenges, and random elements to map a probable series of outcomes for all players, the method comprising: accepting, through the gaming machine, initiation of play by a player; providing, by the gaming machine, one or more single-player games associated with a plurality of game parameters and having one or more features requiring the application of video game skill by the player during game play thereof, wherein the games are chosen from a Playfield Selection Pool using a random number generator, comprising: a first random number used to choose a Playfield from the Playfield Selection Pool, wherein the Playfield is set to have a Maximum Available Payout; and a second random number used to choose a specific game session from the already chosen Playfield; evaluating and recording, by the gaming machine, the results of the play of the said game session in the said Playfield; presenting, by the gaming machine, a Paytable to the player, wherein the Paytable comprises one or more lines of payouts corresponding to play results; evaluating and distributing, by the gaming machine, any payout earned according to the best play results and the Paytable; and managing, through the gaming machine, the variance of Return To Player (RTP) of the Paytable, by adjusting selection weights of different Playfields presented to a player, wherein different Playfields relate to respective Maximum Available Payouts.

In some embodiments, the player plays the game via a game controller. In further embodiments, the game controlled comprises one or more of: a gamepad, a paddle, a joystick, a trackball, a throttle quadrant, a steering wheel, a yoke, pedals, a keyboard, a mouse, a touch screen, a motion sensor, a light gun, a rhythm game controller, a console game controller. In some embodiments, the gaming machine accepts initiation by two or more players, provides two or more single-player game sessions, evaluates and records the results of the play of two or more game session, and evaluates and distributes respective payouts to the two or more players. In some embodiments, the managing of the Return To Player variance is based on one or more of: mid-game metrics, Key Scores, non-Key Scores, end-of-game results, the difference between actual Maximum Available Payouts and actual payouts, and the difference between actual Maximum Attainable Key Scores and actual Key Scores. In some embodiments, the Return To Player variance is managed by adjusting one or more of: selection weights of a of at least one a first prize from a first variable-prize selection pool, the frequency of a bonus award, the amount of time available within a Play Session, and the number of player actions available with a Play Session. In some embodiments, the adjusting of the Return To Player is applied to one or more of: a current game in progress and a future game. In some embodiments, the gaming machine is a stand-alone unit. In some embodiments, the gaming machine is connected to a central server system from which random results are generated and communicated to the gaming machine. In some embodiments, the Maximum Available Payout is based upon the Maximum Attainable Key Score associated with each Playfield. In some embodiments, the games in the Playfield Selection Pool comprise one or more games with a time limit. In further embodiments, the games comprise a racing game, wherein a player races on a track to achieve the best track time within a given timeframe. In some embodiments, the racing game comprises an optimum path on the racetrack and an optimum track time along the optimum path. In some embodiments, the games in the Playfield Selection Pool include at least one game with a limit on the number of player actions allowed during game play. In some embodiments, the games in the Playfield Selection Pool include at least one game with at least one strategic skill decision required of the player. In some embodiments, the games comprise one or more of: a maze game, a sports game, a spelling game, a catching game, an avoiding game, a balancing game, a drawing game, a collecting game, a shooting game, an exercise-based game, a role playing game, a casual game, a racing game, a fighting game, a first person shooting game, a massively multiplayer online role-playing game (MMORPG), a side view projectile game, a top view projectile game, quartering view projectile game, or a massively multiplayer online role-playing game, a matching game, a hidden object game, a word finding game, a word construction game, a path game, a time-management game, a resource management game, a plant growing game, an animal raising game, a shape placing game, a pattern matching game, a rhythm matching game, a memory game, a color completion game, a linking game, a virtual fishing game, an animal simulation game, and any suitable game of skill. In some embodiments, the gaming machine is configured to accept a player's bet that a play result will be achieved during the game session. In some embodiments, the player makes extra bets during the game based on the progress of the game. In some embodiments, the player is provided with a single chance to achieve a specific Key Score during a game session. In some embodiments, the gaming machine awards the player additional time to complete the game session. In further embodiments, the said additional time awarded is based upon the gaming machine determining, via evaluation of mid-game progress, that the probability that the player earns less than the Maximum Available Payout without said additional time is greater than a preset probability. In some embodiments, the player plays in a practice mode with a small price without betting or returns.

In another aspect, disclosed herein is a computer-implemented system for adapting games of skill into a gaming machine by balancing player skill, game challenges, and random elements to map a probable series of outcomes for all players, the system comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games associated with a plurality of game parameters and having one or more features requiring the application of video game skill by the player during game play thereof, wherein the games are chosen from a Playfield Selection Pool using a random number generator, comprising: a first random number used to choose a Playfield from the Playfield Selection Pool, wherein the Playfield is set to have a Maximum Available Payout; and a second random number used to choose a specific game session from the already chosen Playfield; a software module configured to evaluate and record the results of the play of the said game session in the said Playfield; a software module configured to present a Paytable to the player, wherein the Paytable comprises one or more lines of payouts based on a player's play results; a software module configured to evaluate and distribute any payout earned according to the best play results and the Paytable; and a software module configured to manage the variance of Return To Player (RTP) of the Paytable, by adjusting selection weights of different Playfields presented to a player, wherein different Playfields relate to respective Maximum Available Payouts.

In another aspect, disclosed herein is non-transitory computer-readable storage media encoded with a computer program including instructions executable by a processor to create an application for adapting games of skill into a gaming machine by balancing player skill, game challenges, and random elements to map a probable series of outcomes for all players, the application comprising: a software module configured to accept initiation of play by a player; a software module configured to provide one or more single-player games associated with a plurality of game parameters and having one or more features requiring the application of video game skill by the player during game play thereof, wherein the games are chosen from a Playfield Selection Pool using a random number generator, comprising: a first random number used to choose a Playfield from the Playfield Selection Pool, wherein the Playfield is set to have a Maximum Available Payout; and a second random number used to choose a specific game session from the already chosen Playfield; a software module configured to evaluate and record the results of the play of the said game session in the said Playfield; a software module configured to present a Paytable to the player, wherein the Paytable comprises one or more lines of payouts based on a player's play results; a software module configured to evaluate and distribute any payout earned according to the best play results and the Paytable; and a software module configured to manage the variance of Return To Player (RTP) of the Paytable, by adjusting selection weights of different Playfields presented to a player, wherein different Playfields relate to respective Maximum Available Payouts.

In another aspect, disclosed herein is a computer-implemented method of adapting games of skill into a gaming machine, wherein the method balances player skill, game challenges, and random elements to map a probable series of outcomes for all players, the method comprising: accepting, through the gaming machine, initiation of play by a player; providing, by the gaming machine, one or more single-player games of video game skill, wherein games are chosen from a Playfield Selection Pool using a random number generator; evaluating and recording, by the gaming machine, the results of the play of the said game session in the said Playfield; presenting, by the gaming machine, a Paytable to the player, wherein the Paytable comprises one or more lines of payouts based on a player's play results; and evaluating and distributing, by the gaming machine, any payout earned according to the best play results and the Paytable.

In some embodiments, a first random number chooses a Payout Level, and a second random number chooses a Play Field from a collection of Play Fields which all have the same Maximum Available Payout as said chosen Payout Level. In some embodiments, the system further comprises one or more modules monitoring the actual Return To Player and adjusting game parameters to manage the variance of said Return To Player. In further embodiments, wherein the adjusting of the Return To Player variance is based on one or more of: mid-game metrics, Key Scores, non-Key Scores, end-of-game results, the difference between actual Maximum Available Payouts and actual payouts, and the difference between actual Maximum Attainable Key Scores and actual Key Scores. In further embodiments, the Return To Player variance is managed by adjusting one or more of: selection weights of different Playfields presented to a player, wherein different Play Fields relate to respective Maximum Available Payouts, selection weights of a of at least one a first prize from a first variable-prize selection pool, the frequency of a bonus award, the amount of time available within a Play Session, and the number of player actions available with a Play Session. In further embodiments, the adjusting of the Return To Player is applied to one or more of: a current game in progress and a future game. In some embodiments, the initiation includes the staking of a bet by the player, wherein the bet comprises one or more of: monetary currency, virtual currency, and the equivalents. In some embodiments, the payout comprises one or more of: a progressive jackpot, a physical prize, non-redeemable points, non-accumulating points, and other equivalents. In further embodiments, the currency of the bet is not the same as the currency of said payout. In further embodiments, the player makes a percentage of original bet to restart a game of skill. In some embodiments, the gaming machine is a stand-alone unit. In some embodiments, the gaming machine is connected to a central system from which outcomes are retrieved, wherein the central system comprises one or more of: a Class II gaming system, a video lottery terminal, and a networked client-server system. In some embodiments, the Maximum Available Payout is based upon the Maximum Attainable Key Score associated with each Playfield. In some embodiments, the games of video skill comprise one or more games with a time limit. In further embodiments, the one or more games of skill comprise a racing game, wherein a player races on a track to achieve the best track time within a given timeframe. In further embodiments, the racing game comprises an optimum path on the racetrack and an optimum track time along the optimum path. In some embodiments, the games of video skill include at least one game with a limit on the number of player actions. In some embodiments, the games of video skill include at least one game with at least one strategic skill decision required of the player. In some embodiments, the one or more games of skill comprise one or more of: a maze game, a sports game, a spelling game, a catching game, an avoiding game, a balancing game, a drawing game, a collecting game, a shooting game, an exercise-based game, a role playing game, a casual game, a racing game, a fighting game, a first person shooting game, a massively multiplayer online role-playing game (MMORPG), a side view projectile game, a top view projectile game, quartering view projectile game, or a massively multiplayer online role-playing game, a matching game, a hidden object game, a word finding game, a word construction game, a path game, a time-management game, a resource management game, a plant growing game, an animal raising game, a shape placing game, a pattern matching game, a rhythm matching game, a memory game, a color completion game, a linking game, a virtual fishing game, an animal simulation game, and any suitable game of skill. In some embodiments, the player ends a game of skill at any time when satisfied with their results. In some embodiments, the player quits a game of skill at any time to move to a next game of skill. In some embodiments, the gaming machine accepts a player's extra bet that a play result will be achieved. In some embodiments, the player makes extra bets during the game of skill based on the progress of the game. In some embodiments, the player has only one chance to achieve a specific Key Score. In some embodiments, the player plays the game via a game controller. In further embodiments, the game control comprises one of more of: a gamepad, a paddle, a joystick, a trackball, a throttle quadrant, a steering wheel, a yoke, pedals, a keyboard, a mouse, a touch screen, a motion sensor, a light gun, a rhythm game controller, a console game controller. In some embodiments, the gaming machine awards the player additional time to complete the game session. In further embodiments, said additional time awarded is based upon the gaming machine predicting, via evaluation of mid-game progress, that the player is likely to earn less than the Maximum Available Payout without said additional time.

In another aspect, disclosed herein is a computer-implemented system for adapting games of skill into a gaming machine by balancing player skill, game challenges, and random elements to map a probable series of outcomes for all players, the system comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games of video game skill, wherein games are chosen from a Playfield Selection Pool using a random number generator; a software module configured to evaluate and record the results of the play of the said game session in the said Playfield; a software module configured to present a Paytable to the player, wherein the Paytable comprises one or more lines of payouts based on a player's play results; and a software module configured to evaluate and distribute any payout earned according to the best play results and the Paytable.

In some embodiments, a first random number chooses a Payout Level, and a second random number chooses a Play Field from a collection of Play Fields which all have the same Maximum Available Payout as said chosen Payout Level. In some embodiments, the system further comprises monitoring the actual Return To Player and adjusting game parameters to manage the variance of said Return To Player. In further embodiments, wherein the adjusting of the Return To Player variance is based on one or more of: mid-game metrics, Key Scores, non-Key Scores, end-of-game results, the difference between actual Maximum Available Payouts and actual payouts, and the difference between actual Maximum Attainable Key Scores and actual Key Scores. In further embodiments, the Return To Player variance is managed by adjusting one or more of: selection weights of different Playfields presented to a player, wherein different Play Fields relate to respective Maximum Available Payouts, selection weights of a of at least one a first prize from a first variable-prize selection pool, the frequency of a bonus award, the amount of time available within a Play Session, and the number of player actions available with a Play Session. In further embodiments, the adjusting of the Return To Player is applied to one or more of: a current game in progress and a future game. In some embodiments, the player plays the game via a game controller. In further embodiments, the game control comprises one of more of: a gamepad, a paddle, a joystick, a trackball, a throttle quadrant, a steering wheel, a yoke, pedals, a keyboard, a mouse, a touch screen, a motion sensor, a light gun, a rhythm game controller, a console game controller. In some embodiments, the adjusting of the Return To Player is based on one or more of: mid-game metrics, Key Scores, non-Key Scores, end-of-game results, the difference between actual Maximum Available Payouts and actual payouts, and the difference between actual Maximum Attainable Key Scores and actual Key Scores.

In another aspect, disclosed herein is non-transitory computer-readable storage media encoded with a computer program including instructions executable by a processor to create an application for adapting games of skill into a gaming machine by balancing player skill, game challenges, and random elements to map a probable series of outcomes for all players, the application comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games of video game skill, wherein games are chosen from a Playfield Selection Pool using a random number generator comprising: a first random number used to choose a Playfield from the Playfield Selection Pool, wherein the Playfield is set to have a Maximum Available Payout; and a second random number used to choose a specific game session from the already chosen Playfield; a software module configured to evaluate and record the results of the play of the said game session in the said Playfield; a software module configured to present a Paytable to the player, wherein the Paytable comprises one or more lines of payouts based on a player's play results; a software module configured to evaluate any payout earned by the player according to the best play results and the Paytable; and a software module configured to manage Return To Player (RTP) of the Paytable, by adjusting selection weights of different Playfields presented to a player, wherein different Playfields relate to respective Maximum Available Payouts.

In another aspect, disclosed herein is a computer-implemented method of adapting games of skill into a gaming machine, wherein the method balances player skill, game challenges, and random elements to map a probable series of outcomes for all players, the method comprising: accepting, through the gaming machine, initiation of play by a player; providing, by the gaming machine, one or more single-player games of video game skill, wherein games are chosen from a Playfield Selection Pool using a random number generator comprising: a first random number used to choose a Playfield from the Playfield Selection Pool, wherein the Playfield is set to have a Maximum Available Payout; and a second random number used to choose a specific game session from the already chosen Playfield; evaluating and recording, by the gaming machine, the results of the play of the said game session in the said Playfield; presenting, by the gaming machine, a Paytable to the player, wherein the Paytable comprises one or more lines of payouts based on a player's play results; evaluating and distributing, by the gaming machine, any payout earned according to the best play results and the Paytable; and managing, through the gaming machine, Return To Player (RTP) of the Paytable, by adjusting selection weights of different Playfields presented to a player, wherein different Playfields relate to respective Maximum Available Payouts.

In some embodiments, the initiation includes the staking of a bet by the player, wherein the bet comprises one or more of: monetary currency, virtual currency, and the equivalents. In some embodiments, the payout comprises one or more of: a progressive jackpot, a physical prize, non-redeemable points, non-accumulating points, and other equivalents. In some embodiments, the currency of the bet is not the same as the currency of said payout. In some embodiments, the gaming machine is a stand-alone unit. In some embodiments, the gaming machine is connected to a central system from which outcomes are retrieved, wherein the central system comprises one or more of: a Class II gaming system, a video lottery terminal, and a networked client-server system. In some embodiments, the Maximum Available Payout is based upon the Maximum Attainable Key Score associated with each Playfield. In some embodiments, the games of video skill comprise one or more games with a time limit. In some embodiments, the one or more games of skill comprise a racing game, wherein a player races on a track to achieve the best track time within a given timeframe. In further embodiments, the racing game comprises an optimum path on the racetrack and an optimum track time along the optimum path. In some embodiments, the games of video skill include at least one game with a limit on the number of player actions. In some embodiments, said games of video skill include at least one game with at least one strategic skill decision required of the player. In some embodiments, the one or more games of skill comprise a maze game, a sports game, a spelling game, a catching game, an avoiding game, a balancing game, a drawing game, a collecting game, a shooting game, an exercise-based game, a role playing game, a casual game, a racing game, a fighting game, a first person shooting game, a massively multiplayer online role-playing game (MMORPG), a side view projectile game, a top view projectile game, quartering view projectile game, or a massively multiplayer online role-playing game, a matching game, a hidden object game, a word finding game, a word construction game, a path game, a time-management game, a resource management game, a plant growing game, an animal raising game, a shape placing game, a pattern matching game, a rhythm matching game, a memory game, a color completion game, a linking game, a virtual fishing game, an animal simulation game, and any suitable game of skill. In some embodiments, the player ends a game of skill at any time when satisfied with their results. In some embodiments, the player makes a percentage of original bet to restart a game of skill. In some embodiments, the player quits a game of skill at any time to move to a next game of skill. In some embodiments, the gaming machine accepts a player's extra bet that a play result will be achieved. In some embodiments, the player makes extra bets during the game of skill based on the progress of the game. In some embodiments, the player has only one chance to achieve a specific Key Score. In some embodiments, the player plays the game via a game controller. In further embodiments, the game control comprises one of more of: a gamepad, a paddle, a joystick, a trackball, a throttle quadrant, a steering wheel, a yoke, pedals, a keyboard, a mouse, a touch screen, a motion sensor, a light gun, a rhythm game controller, a console game controller. In some embodiments, the adjusting of the Return To Player is applied to one or more of: a current game in progress and a future game. In some embodiments, the adjusting of the Return To Player is based on one or more of: mid-game metrics, Key Scores, non-Key Scores, end-of-game results, the difference between actual Maximum Available Payouts and actual payouts, and the difference between actual Maximum Attainable Key Scores and actual Key Scores. In some embodiments, the gaming machine awards the player additional time to complete the game session. In further embodiments, the additional time awarded is based upon the gaming machine predicting, via evaluation of mid-game progress, that the player is likely to earn less than the Maximum Available Payout without said additional time.

In another aspect, disclosed herein is a computer-implemented method of offering a game of chance via a gaming machine, comprising: accepting, through the gaming machine, initiation of play; providing, by the gaming machine, one or more single-player games of video game skill; randomly selecting, by the gaming machine, a first Playfield from a Playfield Selection Pool, wherein said first Playfield has a Maximum Available Payout; providing, by the gaming machine, a game session based upon said Playfield; evaluating and recording, by the gaming machine, the results of the play of said Playfield, presenting, by the gaming machine, a first Paytable, wherein the first Paytable specifies a first payout based upon the player attaining a first result; evaluating and distributing, by the gaming machine, any payout earned by the player relative to said first Paytable.

In some embodiments, the initiation includes the staking of a first bet by the player. In further embodiments, the said bet is a monetary currency or its equivalent. In further embodiments, the said bet is a virtual currency or its equivalent. In further embodiments, the currency of said bet is not the same as the currency of said first payout. In some embodiments, the said Playfield Selection Pool includes a second Playfield whose Maximum Available Payout is not the same as the Maximum Available Payout of the first Playfield. In some embodiments, the said first Paytable includes a second payout based upon the player attaining a second result. In further embodiments, only the highest value payout is awarded by the gaming machine. In some embodiments, at least one payout is a progressive jackpot. In some embodiments, at least one payout is a physical prize. In some embodiments, the said random selection of said first Playfield is based upon a random number generator or pseudo random number generator. In some embodiments, the said random selection of said first Playfield is based upon some independent events whose outcome cannot be perfectly predicted. In further embodiments, the said independent event is the outcome of a bingo game. In further embodiments, the said independent event is the outcome of sporting event. In some embodiments, the said gaming machine is a stand-alone unit. In some embodiments, the said gaming machine is connected to a central system from which outcomes are retrieved. In further embodiments, the said central system conforms is a Class II gaming system. In further embodiments, the said gaming machine is a video lottery terminal. In further embodiments, the said gaming machine is a networked client-server system. In some embodiments, the said Maximum Available Payout is based upon the Maximum Attainable Key Score associated with each Playfield. In some embodiments, the said payout is based on a second Paytable. In some embodiments, the said games of video skill include at least one game with a time limit. In further embodiments, the one or more games of skill comprise a racing game, wherein a player races on a track to achieve the best track time within a given timeframe. In further embodiments, the racing game comprises an optimum path on the racetrack and an optimum track time along the optimum path. In some embodiments, the said games of video skill include at least one game with a limit on the number of player actions. In some embodiments, the said games of video skill include at least one game with at least one strategic skill decision required of the player. In some embodiments, the one or more games of skill comprise one or more of: a maze game, a sports game, a spelling game, a catching game, an avoiding game, a balancing game, a drawing game, a collecting game, a shooting game, an exercise-based game, a role playing game, a casual game, a racing game, a fighting game, a first person shooting game, a massively multiplayer online role-playing game (MMORPG), a side view projectile game, a top view projectile game, quartering view projectile game, or a massively multiplayer online role-playing game, a matching game, a hidden object game, a word finding game, a word construction game, a path game, a time-management game, a resource management game, a plant growing game, an animal raising game, a shape placing game, a pattern matching game, a rhythm matching game, a memory game, a color completion game, a linking game, a virtual fishing game, an animal simulation game, and any suitable game of skill. In some embodiments, the player ends a game of skill at any time when satisfied with their results. In some embodiments, the player makes a percentage of original bet to restart a game of skill. In some embodiments, the player quits a game of skill at any time to move to a next game of skill. In some embodiments, the gaming machine accepts a player's extra bet that a first result will be achieved. In some embodiments, the player makes extra bets during the game of skill based on the progress of the game. In some embodiments, the player has only one chance to achieve a specific Key Score. In some embodiments, the initiation is payment of a non-refundable fee in a first currency by the player and any payouts are in a second currency which is a different currency type relative to said a first currency. In further embodiments, the said a second currency for payouts is non-redeemable points. In further embodiments, the said a second currency for payouts is non-accumulating points. In further embodiments, the said a second currency for payouts is a virtual representation of said a first currency which cannot be converted into said a first currency. In some embodiments, the player plays said game via a game controller. In some embodiments, the player plays said game via at least one joy stick device. In some embodiments, the player plays said game via at least one trackball device. In some embodiments, the gaming machine adjusts the Return To Player. In further embodiments, the said adjustment applies to the current game in progress. In further embodiments, the said adjustment applies to at least one future game. In further embodiments, the said adjustment include the changing the selection weighting of at least one a first Playfield from a first Playfield Selection Pool. In further embodiments, the said adjustment includes the changing the selection weighting of at least one a first prize from a first variable-prize selection pool. In further embodiments, the said adjustment is based on at least one mid-game metric. In further embodiments, the said at one mid-game metric is based upon at least one Key Score. In further embodiments, the said at one mid-game metric is based upon at least one non-Key Score. In further embodiments, the said adjustment is based on at least one end-of-game result. In further embodiments, the said adjustment is based on the difference between actual Maximum Available Payout and actual payout. In further embodiments, the said adjustment is based on the difference between actual Maximum Attainable Key Score and actual Key Score. In some embodiments, the gaming machine awards the player additional time to complete the game session. In further embodiments, the said additional time awarded is based upon the gaming machine predicting, via evaluation of mid-game progress, that the player is likely to earn less than the Maximum Available Payout without said additional time. In further embodiments, the probability of said additional time being awarded for a game session with a first Playfield is larger than the probability of said additional time being awarded for a game session with a second Playfield, when the Maximum Available Payout for said first Playfield is larger than the Maximum Available Payout for second said Playfield.

BRIEF DESCRIPTION OF THE DRAWINGS

FIG. 3 shows a non-limiting example of a game Paytable; in this case, a simple, fixed Paytable with five potential Payout Levels based on wager of 1 credit for a race game.

FIG. 4 shows a non-limiting example of an eRTP (expected Return To Player) table; in this case, a table which provides a 75% eRTP based on a game Paytable for a race game.

FIG. 9 shows a non-limiting example of a table of track symbols; in this case, a table of basic elements of a track including: start, finish, straight, left corner and right corner, wherein each segment of a track can be converted into spots or cells whereby each cell takes one (1) millisecond to traverse.

FIG. 10 shows a non-limiting example of a theoretical track; in this case, a race track in Payout Level 1 which has an optimum finish time of 14.00 seconds when all the basic elements are combined.

FIG. 11 shows a non-limiting example of a theoretical track; in this case, a race track in Payout Level 2 which has an optimum finish time of 14.01 seconds when all the basic elements are combined.

FIG. 12 shows a non-limiting example of a theoretical track; in this case, a race track in Payout Level 3 which has an optimum finish time of 14.06 seconds when all the basic elements are combined.

FIG. 13 shows a non-limiting example of a theoretical track; in this case, a race track in Payout Level 4 which has an optimum finish time of 14.11 seconds when all the basic elements are combined.

FIG. 14 shows a non-limiting example of a theoretical track; in this case, a race track in Payout Level 5 which has an optimum finish time of 14.21 seconds when all the basic elements are combined.

FIG. 15 shows a non-limiting example of a Paytable wherein a table of basic elements in a first-person action game is provided including: Normal Enemies and Invincible Enemies, whereby Normal Enemies may be eliminated by the player in normal gameplay, and Invincible Enemies may not be eliminated by the player in normal gameplay.

FIGS. 16-20 show non-limiting examples of Paytables for base games plus Chicken Dinner $ payouts relative to different respective bet sizes, such as $1 Chicken for FIG. 16, $2 Chicken for FIG. 17, $3 Chicken for FIG. 18, $5 Chicken for FIG. 19, $25 Chicken for FIG. 20.

DETAILED DESCRIPTION OF THE INVENTION

Figure 1:
FIG. 1 shows a non-limiting example of a video game gaming machine; in this case, a prototype video game gaming machine, which is a single player or multiplayer experience that replaces traditional slot machines, and in which players bet against the house while competing in video games.

Described herein, in certain embodiments, is a computer-implemented method of adapting games of skill into a gaming machine, wherein the method balances player skill, game challenges, and random elements to map a probable series of outcomes for all players, the method comprising: accepting, through the gaming machine, initiation of play by a player; providing, by the gaming machine, one or more single-player games associated with a plurality of game parameters and having one or more features requiring the application of video game skill by the player during game play thereof, wherein the games are chosen from a Playfield Selection Pool using a random number generator, comprising: a first random number used to choose a Playfield from the Playfield Selection Pool, wherein the Playfield is set to have a Maximum Available Payout; and a second random number used to choose a specific game session from the already chosen Playfield; evaluating and recording, by the gaming machine, the results of the play of the said game session in the said Playfield; presenting, by the gaming machine, a Paytable to the player, wherein the Paytable comprises one or more lines of payouts corresponding to play results; evaluating and distributing, by the gaming machine, any payout earned according to the best play results and the Paytable; and managing, through the gaming machine, the variance of Return To Player (RTP) of the Paytable, by adjusting selection weights of different Playfields presented to a player, wherein different Playfields relate to respective Maximum Available Payouts.

Also described herein, in certain embodiments, is a computer-implemented system for adapting games of skill into a gaming machine by balancing player skill, game challenges, and random elements to map a probable series of outcomes for all players, the system comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games associated with a plurality of game parameters and having one or more features requiring the application of video game skill by the player during game play thereof, wherein the games are chosen from a Playfield Selection Pool using a random number generator, comprising: a first random number used to choose a Playfield from the Playfield Selection Pool, wherein the Playfield is set to have a Maximum Available Payout; and a second random number used to choose a specific game session from the already chosen Playfield; a software module configured to evaluate and record the results of the play of the said game session in the said Playfield; a software module configured to present a Paytable to the player, wherein the Paytable comprises one or more lines of payouts based on a player's play results; a software module configured to evaluate and distribute any payout earned according to the best play results and the Paytable; and a software module configured to manage the variance of Return To Player (RTP) of the Paytable, by adjusting selection weights of different Playfields presented to a player, wherein different Playfields relate to respective Maximum Available Payouts.

Also described herein, in certain embodiments, is non-transitory computer-readable storage media encoded with a computer program including instructions executable by a processor to create an application for adapting games of skill into a gaming machine by balancing player skill, game challenges, and random elements to map a probable series of outcomes for all players, the application comprising: a software module configured to accept initiation of play by a player; a software module configured to provide one or more single-player games associated with a plurality of game parameters and having one or more features requiring the application of video game skill by the player during game play thereof, wherein the games are chosen from a Playfield Selection Pool using a random number generator, comprising: a first random number used to choose a Playfield from the Playfield Selection Pool, wherein the Playfield is set to have a Maximum Available Payout; and a second random number used to choose a specific game session from the already chosen Playfield; a software module configured to evaluate and record the results of the play of the said game session in the said Playfield; a software module configured to present a Paytable to the player, wherein the Paytable comprises one or more lines of payouts based on a player's play results; a software module configured to evaluate and distribute any payout earned according to the best play results and the Paytable; and a software module configured to manage the variance of Return To Player (RTP) of the Paytable, by adjusting selection weights of different Playfields presented to a player, wherein different Playfields relate to respective Maximum Available Payouts.

Also described herein, in certain embodiments, is a computer-implemented method of adapting games of skill into a gaming machine wagering game by balancing player skill, game challenges, and random elements to map a probable series of outcomes for all players, the system comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games of video game skill, wherein games are chosen from a Playfield Selection Pool using a random number generator; a software module configured to evaluate and record the results of the play of the said game session in the said Playfield; a software module configured to present a Paytable to the player, wherein the Paytable comprises one or more lines of payouts based on a player's play results; and a software module configured to evaluate and distribute any payout earned according to the best play results and the Paytable.

Also described herein, in certain embodiments, is a computer-implemented system for adapting games of skill into a gaming machine wagering game by balancing player skill, game challenges, and random elements to map a probable series of outcomes for all players, the system comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games of video game skill, wherein games are chosen from a Playfield Selection Pool using a random number generator; a software module configured to evaluate and record the results of the play of the said game session in the said Playfield; a software module configured to present a Paytable to the player, wherein the Paytable comprises one or more lines of payouts based on a player's play results; and a software module configured to evaluate and distribute any payout earned according to the best play results and the Paytable.

Also described herein, in certain embodiments, is non-transitory computer-readable storage media encoded with a computer program including instructions executable by a processor to create an application for adapting games of skill into a gaming machine wagering game by balancing player skill, game challenges, and random elements to map a probable series of outcomes for all players, the application comprising: a gaming machine comprising at least one processor, an operating system configured to perform executable instructions, and a memory; a computer program including instructions executable by the at least one processor to create an application comprising: a software module configured to accept initiation of play by a player; a software module configured to provide one or more single-player games of video game skill, wherein games are chosen from a Playfield Selection Pool using a random number generator; a software module configured to evaluate and record the results of the play of the said game session in the said Playfield; a software module configured to present a Paytable to the player, wherein the Paytable comprises one or more lines of payouts based on a player's play results; and a software module configured to evaluate and distribute any payout earned according to the best play results and the Paytable.

Also described herein, in certain embodiments, is a computer-implemented method of adapting games of skill into a gaming machine wagering game, wherein the method balances player skill, game challenges, and random elements to map a probable series of outcomes for all players, the method comprising: accepting, through the gaming machine, initiation of play by a player; providing, by the gaming machine, one or more single-player games of video game skill, wherein games are chosen from a Playfield Selection Pool using a random number generator comprising: a first random number used to choose a Playfield from the Playfield Selection Pool, wherein the Playfield is set to have a Maximum Available Payout; and a second random number used to choose a specific game session from the already chosen Playfield; evaluating and recording, by the gaming machine, the results of the play of the said game session in the said Playfield; presenting, by the gaming machine, a Paytable to the player, wherein the Paytable comprises one or more lines of payouts based on a player's play results; evaluating and distributing, by the gaming machine, any payout earned according to the best play results and the Paytable; and managing, through the gaming machine, Return To Player (RTP) of the Paytable, by adjusting selection weights of different Playfields presented to a player, wherein different Playfields relate to respective Maximum Available Payouts.

Also described herein, in certain embodiments, is a computer-implemented method of offering a game of chance via a gaming machine, comprising: accepting, through the gaming machine, initiation of play; providing, by the gaming machine, one or more single-player games of video game skill; randomly selecting, by the gaming machine, a first Playfield from a Playfield Selection Pool, wherein said first Playfield has a Maximum Available Payout; providing, by the gaming machine, a game session based upon said Playfield; evaluating and recording, by the gaming machine, the results of the play of said Playfield, presenting, by the gaming machine, a first Paytable, wherein the first Paytable specifies a first payout based upon the player attaining a first result; evaluating and distributing, by the gaming machine, any payout earned by the player relative to said first Paytable.

In another aspect, disclosed herein are computer-implemented methods of adapting games of skill into a gaming machine wagering game, wherein the method balances player skill, game challenges, and random elements to map a probable series of outcomes for all players, the method comprising: accepting, through the gaming machine, a player's bet; providing, by the gaming machine, one or more single-player games of skill, wherein the Playfield for a given game is randomly selected from a Playfield Selection Pool using a random number generator (RNG) comprising a first random number used to index a lookup table with uniform or non-uniform weights, wherein each Playfield has a predetermined Maximum Available Payout that can be achieved when a certain threshold of skillful player input is applied; a Playfield in which the Playfield is presented as a playable game and in which the player plays the using a video game controller; the posting of the player's best Key Score within a given play session; evaluating said best Key Score relative to the game rules and game Paytable and awarding any prizes upon the determination of any winning outcome.

In some embodiments, the payout is based upon a second Key Score based upon a different metric from a first Key Score. In some embodiments, winning outcomes are defined based upon either a first Key Score attaining a certain value or range of values, or a second Key Score attaining a certain value or range of values. In some embodiments, winning outcomes are defined based upon a first Key Score attaining a certain value or range of values, and a second Key Score attaining a certain value or range of values. In some embodiments, payouts from a first Paytable are based on a first Key Score and payouts from a second Paytable are based on a second Key Score. For example, a shooting game which pays a $2 prize for downing 5 red targets, and pays a $3 prize for downing 5 blue targets, and pays $5 for downing 12 targets of any colors, wherein said prizes are not mutually exclusive.

In some embodiments, the Playfield Selection Pool consists of at least a first Playfield with a first Maximum Available Payout and a second Playfield with a second Maximum Available Payout. In some embodiments, wherein each entry in the lookup table used to randomly select a given Playfield from the Playfield Selection Pool has the same weight, each Playfield is equally likely to be selected.

In some embodiments, wherein a first entry in said lookup table has a first selection weight and a second entry in said lookup table has a second selection weight not equal to the first selection weight, the probability of a given Playfield being selected is proportional to the lookup entry weight for that Playfield relative to the sum total of all lookup weights. In some embodiments, the selection weight for at least a first Playfield is modified when said first Playfield is selected so as to eliminate or reduce the possibility of said first Playfield being selected twice in a row. In some embodiments, the selection weight for at least a first Playfield is modified based on the level of player skilled applied during an active and/or a completed first game session. In some embodiments, the selection weight for at least a first Playfield is modified based on the Key Score outcome of a first active or completed game. In some embodiments, the selection weight for at least a first Playfield is modified based on the payout achieved in a first completed game session relative to the Maximum Available Payout for said first game session.

In some embodiments, the distribution of Maximum Available Payouts of all Playfields, relative to the weighting, if any, of said Playfields, is constructed such that the expected Return To Player (eRTP) is a specific value or is within a specific range of values were every game to be played at optimum skill level.

In some central determination system (CDS) embodiments, each pre-determined outcome is pre-assigned a Playfield. In some embodiments, said pre-determined outcomes stored in a shuffled ordered and are accessed in a linear order wherein each pre-determined outcome can only be accessed once. In some embodiments, said pre-determined outcomes stored in a shuffled or unshuffled ordered and are accessed in a shuffled order wherein each pre-determined outcome can only be accessed once. In some CDS embodiments, if the player input skill applied during a given game session has not produced the Key Score required to achieve the Maximum Available Payout attainable in said game session, an additional prize is awarded to the player so as to guarantee the full Maximum Available Payout associated with the corresponding pre-determined outcome for said game session.

In some embodiments, the Paytable has a first payout associated with a first Key Score and a second payout associated with a second Key Score, wherein only the highest payout of said payouts is awarded. In some embodiments, the mapping of Key Score and payouts does not change from game to game. In some embodiments, the mapping of Key Score and payouts of a first Playfield is not the same as for a second Playfield. In some embodiments, the highest Key Score listed on said Paytable is lower than the highest possible Key Score for at least a first Playfield. For example, a Paytable whose top award is defined by successfully downing 10 or more targets or a Paytable whose top award is defined by successfully completing a task within a certain time period or less.

In some embodiments, the one or more games of skill include, but are not limited to (a) a maze game; or (b) a sports game; or (c) a spelling game; (d) or a catching game; or (e) an avoiding game; or (e) a balancing game; or (f) a drawing game; or (g) a collecting game; or (h) a first-person shooting game; or (i) a side view projectile game; or (j) a top view projectile game; or (k) quartering view projectile game; or (l) an exercise-based game; or (m) a role playing game (RPG); or a racing game; or (n) a fighting game; or (o) a massively multiplayer online role-playing game (MMORPG); or (p) a matching game; or (q) a hidden object game; or (r) a word finding game; or (s) a word construction game; or (t) a path game; or (u) a time-management game; or (v) a resource management game; or (w) a plant growing game; or (x) an animal raising game; or (y) a shape placing game; or (z) a pattern matching game; or (aa) a rhythm matching game; or (ab) a memory game; or (ac) a color completion game; or (ad) a linking game; or (ae) a virtual fishing game; or (af) an animal simulation game; or (ag) any suitable game of skill; or (ah) any combination thereof.

In some embodiments, the VGM is a single player video game gaming machine in which the players bet against the house. In further embodiments, the VGM is a video game gaming machine in which players bet against the house while competing in multiplayer video games. In some variations, competition between players is based on real-time Key Scores where each player plays his or her own VGM. In some variations, competition between players is based on real-time secondary scores where each player plays his or her own VGM. In some other variation, competition between players is based on recorded prior outcomes, such as the best payout recorded on a given VGM or such as the best payout recorded across a plurality of linked VGMs. In some multiplayer embodiments, the action of a first player cannot affect the game outcome of a second player. In some multiplayer embodiments, the action of a first player can affect the game outcome of a second player, for example, in the depletion of a resource available to both a first player and a second player.

In still further embodiments, the one or more games of skill comprise a racing game, wherein a player races on a track to achieve the best track time within a given timeframe. In some other embodiments, the one or more games of skill comprise a racing game, wherein a player races on a track to achieve the greatest distance travelled within a given timeframe.

In some embodiments, the video game control comprises one or more of: a gamepad, a paddle, a joystick, a trackball, a throttle quadrant, a steering wheel, a yoke, pedals, a keyboard, a mouse, a touch screen, a motion sensor, a light gun, a rhythm game controller, a console game controller (e.g., an Xbox controller, a PlayStation controller, a Wii controller, and the like). In some embodiments, the game is displayed on one or more display devices including a video display, a 3D display, an LCD display, projected image display or any suitable display. In some embodiments, the gaming machine comprises external facades that are reversibly applied to a plurality of external surfaces of the gaming machine. In further embodiments, the external facades are magnetically reversibly applied.

In some embodiments, a game of skill ends when the player achieves Maximum Attainable Key Score and Maximum Available Payout. In some embodiments, the player ends a game of skill at any time when satisfied with their results. In some embodiments, the player makes a percentage of original bet to restart a game of skill. In some embodiments, the player quits a game of skill at any time to move to a next game of skill. In some embodiments, the gaming machine accepts a player's extra bet that a Key Score will be achieved. In some embodiments, the player makes extra bets during the game of skill based on the progress of the game. In some embodiments, the player has only one chance to achieve a specific Key Score. In some embodiments, the application further comprises a software module configured to allow the player to play in a practice mode with a small price without betting or returns.

In some embodiments, the bet accepted by the VGM is monetary currency or its equivalent provided through a cashless wagering system, such as a Ticket-In-Ticket-Out ("TITO") ticket. In some embodiments, the bet accepted by the VGM is one or more tokens or some other form of alternate currency. In some embodiments, play on a VGM is awarded as part of a promotional event. In some embodiments, the VGM awards monetary currency prizes or its equivalent. In some embodiments, the VGM awards tokens or some other form of alternate currency. In some embodiments, the VGM awards points for a player loyalty card program. In some embodiments, the VGM awards points or virtual currency to be used in an alternate game and/or game Playfield. In some embodiments, the VGM awards physical prizes such as a car, show tickets, buffet tickets, a commemorative coin, or any other suitable physical prize. In some embodiments, the VGM awards one or more entries into a sweepstakes drawing. In some embodiments, the VGM awards a progressive jackpot. In some embodiments, the VGM awards a bonus prize redemption event.

In some embodiments, the methods, systems, and media described herein include a gaming machine, or use of the same. In further embodiments, the gaming machine includes one or more hardware central processing units (CPU) that carry out the device's functions. In still further embodiments, the gaming machine further comprises an operating system configured to perform executable instructions. In some embodiments, the gaming machine is optionally connected a computer network. In further embodiments, the gaming machine is optionally connected to the Internet such that it accesses the World Wide Web. In still further embodiments, the gaming machine is optionally connected to a cloud computing infrastructure. In other embodiments, the gaming machine is optionally connected to an intranet. In other embodiments, the gaming machine is optionally connected to a data storage device.

CERTAIN DEFINITIONS

Unless otherwise defined, all technical terms used herein have the same meaning as commonly understood by one of ordinary skill in the art to which this invention belongs. As used in this specification and the appended Claims, the singular forms "a," "an," and "the" include plural references unless the context clearly dictates otherwise. Any reference to "or" herein is intended to encompass "and/or" unless otherwise stated.

Gaming Industry Terms

The following terms, often used within the gaming industry, are defined for clarity:

The term "game session" refers to the totality of time from the acceptance of a player wager and corresponding start of play until the end of all play such that a new wager can be accepted.

The term "play session" refers to the totality of time from insertion or activation of funds until the player leaves the game. A play session usually includes one or more game sessions.

The term "payout" refers to type of award paid for a winning outcome. Such prizes are often a specific multiple of part or all of the wagers placed on the game, though additional types of prizes shall be presented later in the present disclosure.

The term "Return To Player," often referred to in the gaming industry and corresponding regulatory agencies by the acronym "RTP," means the mathematically expected long-term player payback percentage of a gaming proposition. However, for the purposes of the present disclosure, there is a need to differentiate between this traditional interpretation of RTP and actual RTP based on a fixed number of actual wagers and payouts. Thus each of the two specific varieties of RTP are defined with their own unique terms.

The term "expected Return To Player" or eRTP refers the traditional definition of RTP as a reflection of the mathematically expected long-term player payback.

The term "actual Return To Player" or "aRTP" refers to the ratio of total actual payouts to total actual wagers over a given period of time or specific number of games for a specific math model implemented on a particular gaming machine or implemented by one or more gaming machines.

There are many forms of "skill" that can apply to games of chance. If not otherwise modified, the term "skill" within the present disclosure refers to "video game skill" defined below.

The term "video game skill" refers to time-sensitive inputs which can be sub-categorized into "twitch skill" and "manual skill."

The term "twitch skill" or "twitch game" refers physical skill involving specific timing, and/or positioning and/or movement control which requires a certain level of hand-eye coordination.

The term "manual skill" refers to physical skill merely consisting of activating a device input, said activation not requiring any special timing or dexterity, e.g., pressing a button, pressing a non-moving area of a touch screen whose hotspot is significantly larger than the contact point of a finger or stylus, clicking a mouse button, trackball button, or controller button when the corresponding cursor or pointer is positioned within a non-moving area of the display whose hotspot is significantly larger than cursor or pointer. A well-known example of manual skill in the gaming industry is the very rapid pressing of the SPIN button on a slot machine during a slots tournament.

The term "pseudo-skill" refers to game mechanisms which falsely try to make it appear that twitch-skill like input affects the final outcome, when in fact the final outcome will be the same irrespective of such inputs.

The term "strategic skill" refers a knowledgeable choice made by the player to directly or indirectly improve their chance of winning and/or increasing the amount of their winnings. Within the gaming industry, games such as video poker, blackjack and many varieties of poker require non-trivial skill for a given player to optimize their expected payback. Similarly, there are numerous video games wherein the player makes numerous strategic decisions, either with or without time limits based on the game rules.

The term "blind choice" describes a mechanism by which the player makes a blind choice to reveal an outcome or payout. For example, like selecting one of three covered boxes to see how many free spins are awarded in the subsequent free spins bonus round. Though some players may believe it is possible to obtain better than average results by spotting patterns within a sequence of truly random outcomes or having special psychic abilities, there is no scientific evidence to support such beliefs.

The term "Paytable" refers to a summary listing of winning outcomes and their respective payout. In practice, Paytables often include some of the game rules such as "Malfunction voids all pays and play" and "Only highest winner paid." The term "See Pays," which is not otherwise used in this disclosure, refers to all of the Paytables applicable to the given game plus all stated rules.

Invention-Specific Terms

The term "video game skill" refers to time-sensitive inputs which can be sub-categorized into "twitch skill" and "manual skill."

The following terms are used within the present disclosure to describe the present invention.

The term "VGM" or "Video Game Gaming Machine" is a gaming device similar to a slot machine which allows players to place wagers and have control over the outcome of such wagers via skillful input by the player during game play. A VGM is used by players to engage in activities such as gambling or wagering. More specifically, a VGM is a computer-implemented system, or a non-transitory computer-readable storage media encoded with a computer program including instructions executable by a processor which is an embodiment of the present invention.

The term "Playfield" refers to all of the game elements and game parameters which can affect the play and/or pay characteristics of the game session in which it is instantiated. The Playfield for a given game session is usually selected randomly at the start of each game session.

The term "Playfield Selection Pool" refers to a plurality of available Playfields from which the specific Playfield for a given game session is to be selected.

The term "Key Score" refers to the tally or metric or any other suitable result from playing some embodiments of the present invention and which is used for the determination of payouts, if any. For example, the number of targets downed in a shooting game is a Key Score if the Paytable is defined so at to award prizes based on total number of targets downed.

The term "Secondary Score" refers to any other type of tally or metric or any other result from playing some embodiments of the present invention which is not directly used for the determination of payouts. For example, the number of consecutive hits on target without a miss.

The term "Qualifying Key Score" is a Key Score which corresponds to a non-zero payout.

The term "Maximum Attainable Key Score" refers to highest Key Score that can be achieved from the skillful play of a given Playfield.

The term "Maximum Available Payout" refers to highest payout associated with the Maximum Attainable Key Score. Each Playfield is constructed in such a way as to have a Maximum Attainable Key Score and corresponding Maximum Available Payout.

The term "Payout Level" refers to a specific Maximum Available Payout and/or all Playfields with said Maximum Available Payout.

The term "Optimal Skill" refers to the application of video game skill (defined earlier) sufficient to earn the Maximum Available Payout within a given Playfield. Optimal Skill does not necessarily mean perfect skill or best possible skill. For example, in a game whose Paytable defines a winning outcome as being within a range of Key Scores, such as "5 or 6 downed targets pays 2×" or "10 or more downed targets pays 20×", any applied video game skill which attains the lowest Key Score required for a given Maximum Available Payout is deemed optimal skill, even if the application of a greater level of skill could attain a higher Key Score for the same payout within a given Playfield.

The term "Sub-Optimal Skill" refers to the application of video game skill which is unable to earn the Maximum Available Payout.

Other invention-specific terms are defined at time of first use within the present disclosure.

Gaming Machine

In accordance with the description herein, suitable gaming machines include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art. In some embodiments, gaming machines are used for activities such as gambling and wagering.

In some network-based embodiments, a client-server architecture provides random Playfield selection to only occur on at least one secure server such that hacked or otherwise compromised client software affect the maximum possible prize available within any given game.

In some embodiments, the gaming machine includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the gaming machine includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the gaming machine includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the gaming machine includes an input or communication device to receive information from a user, which may also comprise a graphical user interface.

Video Game Gaming Machine (VGM)

In some embodiments, a video gaming game machine has the form of a traditional slot machine or arcade cabinet but the unique player experience brings a new element of skill to the casino floor. In some embodiments, a video gaming game machine allows players to engage in activities such as gambling and wagering. In some embodiments, a video gaming game machine utilizes all approved hardware components similar to traditional slot machines. In some embodiments, a video game gaming machine works using a math model that balances player skill, game difficulty, and random bonuses to map a probable series of outcomes for all players. In some embodiments, a video game gaming machine comprises at least one processor, an operating system configured to perform executable instructions, and a memory.

Referring to FIG. 1, in a particular embodiment, a prototype video game gaming machine is provided to create a single player or multiplayer experience that replaces traditional reel slot machines, wherein players bet against the house while competing in multiplayer video games. In some embodiments, a video game gaming machine is played very similarly to a traditional slot machine but will allow the player to have control over the outcome of the game while still providing the required eRTP (expected Return To Player).

In some embodiments, a video game gaming machine sets a Playfield for the player to play games using a video game controller and to post the player's best Key Score within a given playing time. In some embodiments, a video game gaming machine presents a fixed Paytable to the player, wherein the Paytable presents a plurality of payouts based on a player's different possible Qualifying Key Scores. In some embodiments, a video game gaming machine distribute a payout to the player using a fixed Paytable based on the player's best Key Score of the provided games of skill.

In some embodiments, a gaming machine includes one or more facades. In further embodiments, the gaming machine comprises external facades that are reversibly applied to a plurality of external surfaces of the gaming machine. In still further embodiments, the external facades are magnetically reversibly applied.

Math Model

In some embodiments, the methods, systems, and media described herein include a math model, or use of the same. In some embodiments, a math model describes the adaptation of games of skill into a gaming machine wherein the math model balances player skill, game challenges, and random elements to map a probable series of outcomes for all players.

In some embodiments, a math model includes a fixed Paytable. In some embodiments, a Paytable winning outcome defines the same prize for finishing within the same time range irrespective of the Playfield which a player is playing. In some embodiments, a math model provides a calculated eRTP (expected Return To Player) based on optimal play of each Playfield wherein not every payout is attainable within every Playfield. In some embodiments, the math model includes payouts from bonus events. In some embodiments, a bonus event occurs at least once in every game. In some embodiments, a bonus event is not guaranteed to occur at least once in every game. In some embodiments, bonus events occur randomly. In some embodiments, bonus events occur based on some event, such as when the VGM detects a certainly level of sub-optimal play.

Figure 5:
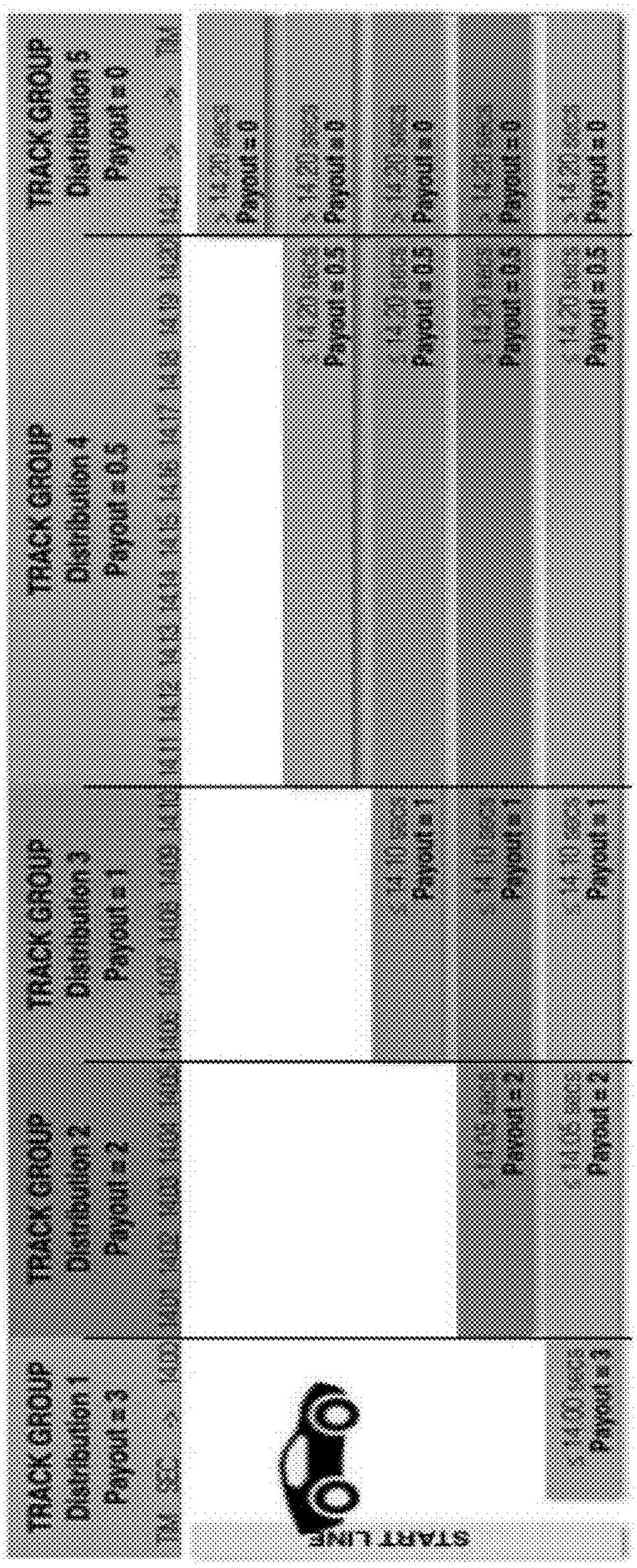
FIG. 5 shows a non-limiting example of a math model of a race game; in this case, a diagram displaying a player's payout outcome based on his actual finish time while playing in different track groups of race games.

Referring to FIG. 5, in a particular embodiment, a math model of a race game is described wherein a diagram displays the payout to be awarded to the player relative to his actual finish time while playing in different Payout Levels or track groups of race games. In further embodiments, the game design (specifically the weightings for eRTP) relies on the concept of optimum play. In some embodiments, optimum play specifies that eRTP be calculated assuming the player performs optimally and therefore receives the Maximum Available Payout while playing each game.

In some embodiments, the math model is applicable to the entire range of both core and casual games, including racing games, fighting games, first-person shooters (FPS), platforms, action-adventure games as well as casual games such as Tetris, "Match 3" games, and other common formats. In further embodiments, the same game balancing techniques in a math model is applicable to all game genres.

Playfield

In some embodiments, Playfields are chosen from a Playfield Selection Pool using a random number generator. In some embodiments, aRTP (actual Return To Player) is managed by adjusting the weighting selection of Playfields from the Playfield Selection Pool relative to the Maximum Available Payout inherent within each Playfield.

In some embodiments, Playfields are chosen from a Playfield Selection Pool based on some secondary independent event such as, but not limited to, (a) an electronic bingo game; or (b) an electronic scratcher game; or (c) a result of a sporting event or any portion thereof; or (d) a horse racing outcome; or (e) a dog racing outcome; or (f) a Jai alai outcome or any portion thereof or (g) the tossing of one or more coins; or (h) the throwing or rolling of one or more dice; or (i) playing of a slot game; or (j) playing of a card game; or (k) the spinning of a wheel; of (1) any other suitable mechanism or process which produces an unpredictable results; or (m) any combination thereof.

In some embodiments, a Playfield allows players to bet and then have a set time (e.g., under: 60) to play and post their best Key Score. In some embodiments, a Playfield allows players to bet and then have a set time (e.g., under:

60) to play and post their secondary Key Score. In some embodiments, a Playfield displays a leaderboard tracking the progress of all players and provides additional prizes and bonuses, potentially connected to social media.

Game Paytable

Referring to FIG. 3, in a particular embodiment, a simple, fixed Paytable is provided with five potential Payout Levels of Maximum Available Payout outcomes based on wager of 1 credit for a video game. In some embodiments, a winning outcome is the minimum time the player must score to receive the corresponding payout and provides a simple visual cue for the player and connection to traditional slot machines.

Return to Player (RTP) Management

In some embodiments, the methods, systems, and media described herein include a Return To Player management system, or use of the same. In some embodiments, a minimum Return To Player in a casino machine is set by government regulations. In some embodiments, a minimum Return To Player is set at 75%. In some embodiments, a minimum Return To Player is set at 83%.

In some embodiments, aRTP (actual Return To Player) is managed by adjusting the selection weights Playfields from the Playfield Selection Pool, wherein each Playfield has a maximum possible Key Score which may or may not be associated with a payout. In some embodiments, aRTP (actual Return To Player) is managed by adjusting the value of a variable size bonus award such as by adjusting the weights associated with the random selection of any given instance of said variable bonus award selection. In some embodiments, aRTP (actual Return To Player) is managed by forcing a specific value to be awarded for a given a variable size bonus award. In some embodiments, aRTP (actual Return To Player) is managed by adjusting frequency with which bonus events are triggered. In some embodiments, aRTP (actual Return To Player) is managed by awarding the player extra time in order to achieve the maximum possible Key Score if current progress within the game session implies that the player will not achieve said maximum possible Key Score otherwise. In some embodiments, aRTP (actual Return To Player) is managed by awarding all players extra time in Playfields with larger payouts to better assure that most players will be able to earn the entirety of the maximum possible award for said Playfield.

Referring to FIG. 4, in a particular embodiment, a table is provided to provide a 75% eRTP based on a game Paytable for a race game. In some embodiments, eRTP (expected Return To Player) is calculated as the sum of the multiplication of the payout of each Payout Level and the chance of selecting a Playfield from said Payout Level.

Maximum Attainable Key Score

In some embodiments, the methods, systems, and media described herein include a Maximum Attainable Key Score, or use of the same. In some embodiments, a Maximum Attainable Key Score represents the best possible game performance a player with the best skill and dexterity achieves given the assigned Playfield. In some embodiments, a Maximum Attainable Key Score is associated with a maximum payout. In some embodiments, a Maximum Attainable Key Score is associated with a non-maximum payout. In some embodiments, a Maximum Attainable Key Score is associated with no payout. In some embodiments, eRTP (expected Return To Player) is calculated based on the Maximum Attainable Key Score.

In some embodiments, a Maximum Attainable Key Score is computed through software simulator to find the best theoretical and mathematical game performance. Referring to FIG. 9, in a particular embodiment, a table of basic elements of a track in a race game is provided including: start, finish, straight, left corner and right corner, wherein each segment of a track can be converted into spots or cells whereby each cell takes one (1) millisecond to traverse.

In some embodiments, a Maximum Attainable Key Score is computed through mathematical calculations using algorithms such as A* Search Algorithm or Dijkstra's Algorithm or similar methods for finding the shortest, or optimum, path between nodes in a graph, which may represent a track in a race game or path on the field in a sports game.

In some embodiments, a Maximum Attainable Key Score is enforced through game design and implementation, to ensure the player achieves the Maximum Available Payout. In some embodiments, a Maximum Attainable Key Score is enforced through game design and implementation, to ensure the player achieves the minimum payout. Referring to FIG. 15, in a particular embodiment, a table of basic elements in a first-person action game is provided including: Normal Enemies and Invincible Enemies, whereby Normal Enemies may be eliminated by the player in normal gameplay, and Invincible Enemies may not be eliminated by the player in normal gameplay. By controlling the weighted distribution of Normal and Invincible Enemies, the game is able to ensure a specific aRTP (actual Return To Player). Also referring to FIGS. 16-20, tables of basic elements plus different Chicken Dinner $ payouts relative to different respective bet sizes, such as $1 Chicken for FIG. 16, $2 Chicken for FIG. 17, $3 Chicken for FIG. 18, $5 Chicken for FIG. 19, $25 Chicken for FIG. 20.

Optimal Skill Play

The present invention includes the means to select or construct a Playfield for a given game session whose maximum possible Key Score, based on the application of Optimal Skill, cannot exceed a specific value. A Key Score which represents the highest possible Key Score for a given Playfield is called a Maximum Attainable Key Score. In some embodiments, all Maximum Attainable Key Scores are Qualifying Key Scores. In some embodiments, at least one Maximum Attainable Key Score is not a Qualifying Key Score.

Embodiments in which at least one payout on the Paytable awards a prize larger than the product of eRTP and the corresponding wager (which is true with every known casino gaming machine), require at least one Playfield whose Maximum Attainable Key Score does not qualify for that payout.

Let's consider a simple example wherein the player controls a virtual golfer at a virtual driving range. This is a 3 button push game. The first button push starts the game, causing the virtual golfer begin its back swing. The second button press is to optimally occur when the virtual golfer is at the perfect top of their swing for furthest distance. Making the second press before this point, or after this point, or not at all will adversely affect the power of the swing. The third button press is to optimally occur is the instant the virtual club touches the virtual ball at the fastest part of the swing. As with the second button press, making a third button press too early or too late or not at all will adversely affect the power of the swing.

The Key Score in this sample game is the distance the virtual golf ball travels. If the virtual ball travels 220 virtual yards, the player wins twice their wager. If the virtual ball travels between 200 and 219 virtual yards, the player wins 0.75% of their wager. If the virtual ball travels less than 200 virtual yards, the player wins half of their wager. The game is comprised of three different Playfields: Field 1 has a 10 mph tail win which will results in the virtual golf ball travelling over 220 virtual yards if the second and third button presses each occur within 10 microseconds of perfect timing; Field 2 has a 5 mph head wind win which will results in the virtual golf ball travelling at least 200 virtual yards if the second and third button presses each occur within 10 microseconds of perfect timing, but will not result in the virtual golf ball travelling at 220 or more virtual yards if the second and third button presses each occur exactly at the point of perfect timing; Field 3 has a 20 mph head win, result in the virtual golf ball travelling less than 200 virtual yards even if the second and third button presses each occur exactly at the point of perfect timing.

When the player activates a game session with a first button press, the VGM (video game gaming machine) randomly selects one of the three Playfields via a weighted table where Field 1 has a weight of 20, Field 2 has a weight of 40, and Field 3 has a weight of 40 which is indexed by a random integer uniformly selected from 1 to 100 inclusively. Therefore, Field 1 has a 20% chance of being selected, Field 2 has a 40% chance of being selected, and Field 3 has a 40% chance of being selected.

The eRTP (expected Return To Player) of this sample game for Optimal Skill play can be calculated as the sum of the eRTP of each payout, which is in turn calculated as the payout value times the probability of occurrence of that payout.

Therefore, for optimal play $$eRTP(game)=(award1*probability1)+(award2*probability2)+(award3*probability3)$$

$$=(2.0*20\%)+(0.75*40\%)+(0.50*40\%)$$

$$=90.0\%$$

Sub-Optimal Skill Play Detection

Sub-Optimal Skill is the application of skill which does not and cannot achieve the Maximum Attainable Key Score for the given Playfield, typically caused by player error or significantly less-than-perfect player input.

In some embodiments of the present invention, Sub-Optimal Skill is determined via an aRTP calculation based on all prior completed play on a given machine or on a group of equivalent machines. In some embodiments, Sub-Optimal Skill is determined via an aRTP calculation based on no more than the last N prior completed play on a given machine or on a group of equivalent machines. In some embodiments, Sub-Optimal Skill is determined via an aRTP calculation based on prior completed play within the current play session. In some embodiments, Sub-Optimal Skill is determined via an aRTP calculation based on prior completed play of all players. In some embodiments, Sub-Optimal Skill is determined via an aRTP calculation based on prior completed play of the current player. In some embodiments, unawarded potential payouts are tracked.

In some embodiments, Sub-Optimal Skill is determined by current Key Score at a particular time within a game session. In some embodiments, Sub-Optimal Skill is determined by considering overall game progress. For example, in a shooting game whose targets require multiple hits to down, a progress measurement would include both downed targets and not-yet-downed targets hit. In some embodiments, Sub-Optimal Skill is determined by considering one or more metrics at a particular time within a game session where none of said metrics is the Key Score.

Sub-Optimal Skill Play Payout Compensation

For regulatory and/or for business reasons, there is a need to restrict the long-term impact of Sub-Optimal Skill on aRTP. In some embodiments of the present invention, sub-optimal play increases the likelihood of, and/or value from, additional payout sources.

Is some embodiments, at least one award provides a variable payout. The value of said variable payout is randomly selected by a secondary determination. The weights incorporated into the weighting tables used in the selection of an award value from an array of possible award values are modifiable based on the level of skill. The lower the skill, the higher the weight values are skewed such that the average expected value correspondingly increases.

In some embodiments, at least one special award is occasionally provided which is not based on a Key Score. In some embodiments, at least one special award is occasionally provided which directly increases the Key Score. In some embodiments, the probability of the awarding of a special award increases based on the lack of determined skilled.

In some embodiments, said special award is redeemable by a given player with based on an input requiring minimal if any dexterity, timing and/or hand-eye coordination. In some embodiments, said special award is awarded to the player automatically without any inputs. In some embodiments, if a said special award is redeemable by a given player with based on an input requiring minimal if any dexterity, timing and/or hand-eye coordination but has not been redeemed within a specified amount of time, said special award is awarded to the player automatically within any inputs. In some embodiments, said special award is redeemable by a given player based on at least one input requiring some level of dexterity, timing and/or hand-eye coordination, wherein the amount of dexterity, timing and/or hand-eye coordination required is greater as determined skill level increases. For example, a game in which a player who is playing with Optimal Skill is provided a special award that is unlikely to be redeemed without affecting Key Score, and a player is playing with low skill is provided an award that is unlikely not to be redeemed.

Returning to the previous golf simulation game example, if the Playfield randomly selected for a given player has a Maximum Attainable Key Score (say in excess of 220 virtual yards) which awards a first payout (2× the wager), but said player's skill in insufficient to achieve that skill, then an alternate payout source is provided relative to said player's actual Key Score. For example, if said player's virtual golf ball travels at least 180 virtual yards (and is thusly eligible for an award 0.75× the wager), then a special award of actual or average value of 1.25× the wager provides the same expected payout as for high skill players. The special award appears as a virtual gopher appears on the virtual landing zone the striking of which awards a prize whose average payout is 1.25× the wager. Had said player played at a high-enough level of skill to have achieved the max possible award for said selected environment, the displayed result shows the virtual golf ball in flight travelling over said virtual gopher. If said player's virtual golf ball travels at least 120 virtual yards but not more than 180 virtual yards (and is thusly eligible for an award of 0.50× the wager), then a special award of actual or average value of 1.50× the wager provides the same expected payout as for high skill players. If said player's virtual golf ball travels less than 120 virtual yards a different award redemption experience is provided to the player for thematic consistency. Specifically, a result in which the virtual ball travels less than 120 virtual yards is designated as a non-qualifying drive and a virtual golf shop is displayed to the player wherein the player is instructed to make at least one blind pick. The average expected value from a given virtual golf shop picking round is comparable or equal to the Maximum Available Payout value associated with the given Playfield.

In some embodiments, the average expected value of a variable-sized award is used to offset any prior under payments. In some embodiments, the actual value awarded from a variable-sized award is used to offset any prior under payments. In some variation, both payment surpluses and deficits are considered. In some other variation, if a given gaming systems pays out more than the current payout deficit, the deficit is merely zeroed.

Proposition Rate

In some embodiments, the methods, systems, and media described herein imply a maximum proposition rate based on the minimum possible time between initiating two independent wagers on the same device. The pace of player betting is critical to VGM (and casino) profitability. Slot machines have optimized player pace to near zombie-like speeds of one bet every 3-4 seconds with the player simply waiting for the next random outcome. Player pace improvements are implemented to suit different players' preferences of pace and to achieve optimal profits for the casinos. In some embodiments, the video game gaming machine comprises player pace improvement methods including, by way of non-limiting examples:

Auto End—race ends automatically if top payout is achieved;

End Early—player is able to end race at any time when satisfied with their results;

Paid Restart—players may pay a percentage of original bet to restart at track start;

Second Chance—players may pay a percentage of original bet to race track again;

Double Up—player may pay to double bet at halfway point during race;

Special Bets—player is able to bet they will exceed result or achieve goal

Progress Bets—player is able to make bets during each game based on progress

Rage Quit—player is able to quit at any time if they want to move to next race;

One & Done—player has only one chance to achieve a specific goal or result.

In some embodiments, a faster player pace increases casino profitability while maintaining, or even increasing, player enjoyment and engagement. In some embodiments, a player pace of 4-6 or more decisions per minute is achieved on the VGM formats through a variety of innovations and formats. In further embodiments, a faster player pace is achieved when a game of skill end through "auto end," wherein a player achieves Maximum Attainable Key Score and Maximum Available Payout. In further embodiments, a faster player pace is achieved through "end early," wherein a player ends a game of skill at any time when satisfied with their results. In further embodiments, a faster player pace is achieved through "special bets," wherein a player makes extra bet that he will exceed a certain Key Score. In further embodiments, a faster player pace is achieved through "progress bets," wherein a player makes extra bets during the game of skill based on the progress of the game. In further embodiments, a faster player pace is achieved through "rage quit," wherein a player chooses to quit a game of skill at any time to move to a next game of skill. In further embodiments, a faster player pace is achieved through "paid restart," wherein a player makes a percentage of original bet to restart a game of skill. In further embodiments, a faster player pace is achieved through "one and done," wherein a player has only one chance to achieve a specific Key Score.

Practice Mode

In some embodiments, the methods, systems, and media described herein include practice mode, or use of the same. In some embodiments, a player gains familiarity with a game of skill while playing in a practice mode. In some embodiments, the VGM allows players to practice, without betting or returns, for the same "price" as the casino's hold. For example, in Ohio the lowest acceptable eRTP is 85% which corresponds to an expected, long-term theoretical casino hold is 15%. On a $1 VGM, players would be able to practice for $0.15 per play. In this way, casinos are generating the same revenue per unit while allowing players to gain familiarity with these new games.

In some embodiments, practice mode may also allow the player to earn and collect virtual currency which may be redeemed for prizes or rewards. In this way, casinos are able to provide a social gaming experience similar to online and mobile games.

API or SDK

In some embodiments, the methods, systems, and media described herein include an API (Application Programming Interface) or SDK (Software Development Kit), or use of the same. In some embodiments, an API or SDK is used to adapt popular games of skill to a gaming machine by balancing player skill, game challenges, and random elements to map a probable series of outcomes for all players. In some embodiments, an API or SDK is applicable to the entire range of both core and casual games, including racing games, fighting games, first-person shooters (FPS), as well as casual games such as Tetris, "Match 3" games, and other common formats. In further embodiments, the same game balancing techniques in a math model is applicable to all game genres.

In some embodiments, an API or SDK adapting popular games to a gaming machine presents a simple, fixed Paytable to players regardless of games type which are played. In some embodiments, an API or SDK adapting popular games to a gaming machine manages Return To Player percentage through the math model without interfering with the settings of said popular games. In some embodiments, an API or SDK adapting popular games to a gaming machine manages Return To Player percentage based on optimum play on the games of skill.

In some embodiments, an API or SDK adapting popular games to a gaming machine presents players exactly the same Playfield in a gaming machine as in a non-gaming machine. In some embodiments, an API or SDK adapting popular games to a gaming machine provides players Playfield chosen from a game pool using a random number generator comprising: a first random number used to choose a Payout Level; and a second random number used to choose a specific Playfield within the already chosen Payout Level.

Video Game Controller

In some embodiments, the gaming machine includes a video game controller to receive information from a user. In some embodiments, the video game controller comprises a keyboard. In some embodiments, the video game controller comprises a pointing device including, by way of non-limiting examples, a gamepad, a paddle, a joystick, a trackball, a throttle quadrant, a steering wheel, a yoke, pedals, a keyboard, a mouse, a touch screen, a motion sensor, a light gun, a rhythm game controller, a console game controller.

In some embodiments, the video game controller comprises a touch screen or a multi-touch screen. In other embodiments, the video game controller comprises a microphone to capture voice or other sound input. In other embodiments, the video game controller comprises a video camera or other sensor to capture motion or visual input. In further embodiments, the video game controller comprises a Kinect, Leap Motion, or the like. In still further embodiments, the video game controller comprises a combination of devices such as those disclosed herein.

Figure 2:
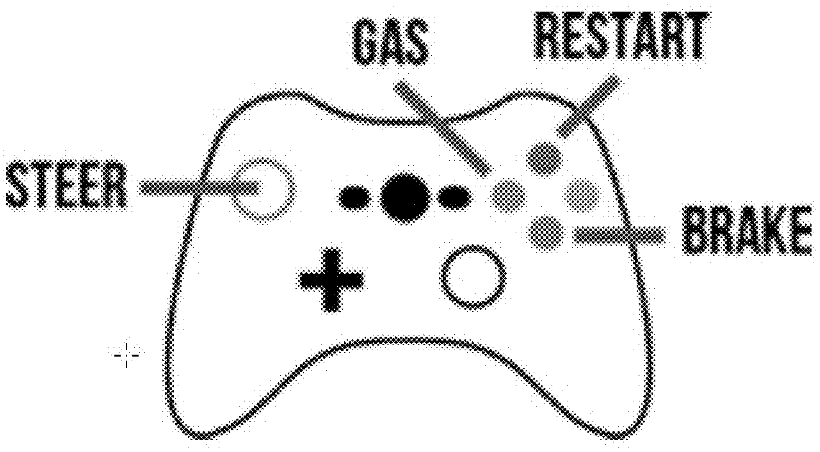
FIG. 2 shows a non-limiting example of a suitable video game controller; in this case, a commercial USB controller which has been designed for the simplest possible operation by players of all skill levels.

Referring to FIG. 2, in a particular embodiment, a commercial USB controller is used as a suitable video game controller which has been designed for the simplest possible operation by players of all skill levels. In further embodiments, this video game controller includes four controls: a left joystick for steer, a "X" button for gas, a "Y" button for restart, and an "A" button for brake.

Gaming Machine Facades

In some embodiments, the gaming machine includes one or more facades. In further embodiments, the gaming machine comprises external facades that are reversibly applied to a plurality of external surfaces of the gaming machine. In still further embodiments, the external facades are magnetically reversibly applied.

Leaderboard

In some embodiments, the methods, systems, and media described herein include a leaderboard, or use of the same. In some embodiments, each video game gaming machine (VGM) or cluster of VGMs units features a leaderboard. In some embodiments, players enter their "gamertag" or other pseudonym to privately identify themselves on the leaderboard.

In some embodiments, leaderboards are connected to social networks such as Facebook and Twitter. In some embodiments, leaderboards are used to track player progress, drive an additional competitive element, and to provide methods for awarding additional prizes, bonuses and jackpots.

Bonuses and Jackpots

In some embodiments, the methods, systems, and media described herein include bonuses and jackpots, or use of the same. In some embodiments, casinos offer additional bonuses and rewards to player activity when a video game gaming machines is limited to modest bets and returns. In some embodiments, players in a VGM win food and lodging from casinos, or prizes from brands and advertisers, or additional cash payouts, progressives, and other forms of bonuses and jackpots based on leaderboard standings or other factors.

Multiplayer Games

In some embodiments, the methods, systems, and media described herein include multiplayer games, or use of the same. In some embodiments, multiplayer games allow multiple players to compete simultaneously and competitively against each other in a secure and regulatory-compliant format. In some embodiments, multiplayer games are similar to multiplayer video poker or blackjack machines currently in casinos.

Carousel Version Gaming Machine

In some embodiments, the methods, systems, and media described herein include a Carousel version gaming machine, or use of the same. In some embodiments, the Carousel version gaming machine provides a multiple-player playing environment wherein a player sits or stands to play and gamble with gaming sessions. In some embodiments, the Carousel version gaming machine provides a multiple-player playing environment wherein multiple players sit or stand to play and gamble with gaming sessions. In some embodiments, the Carousel version gaming machine allows players to sit or stand next to each other. In some embodiments, the Carousel version gaming machine allows players to sit or stand side-by-side to each other. In some embodiments, the Carousel version gaming machine allows players to sit or stand facing each other.

Figure 21:
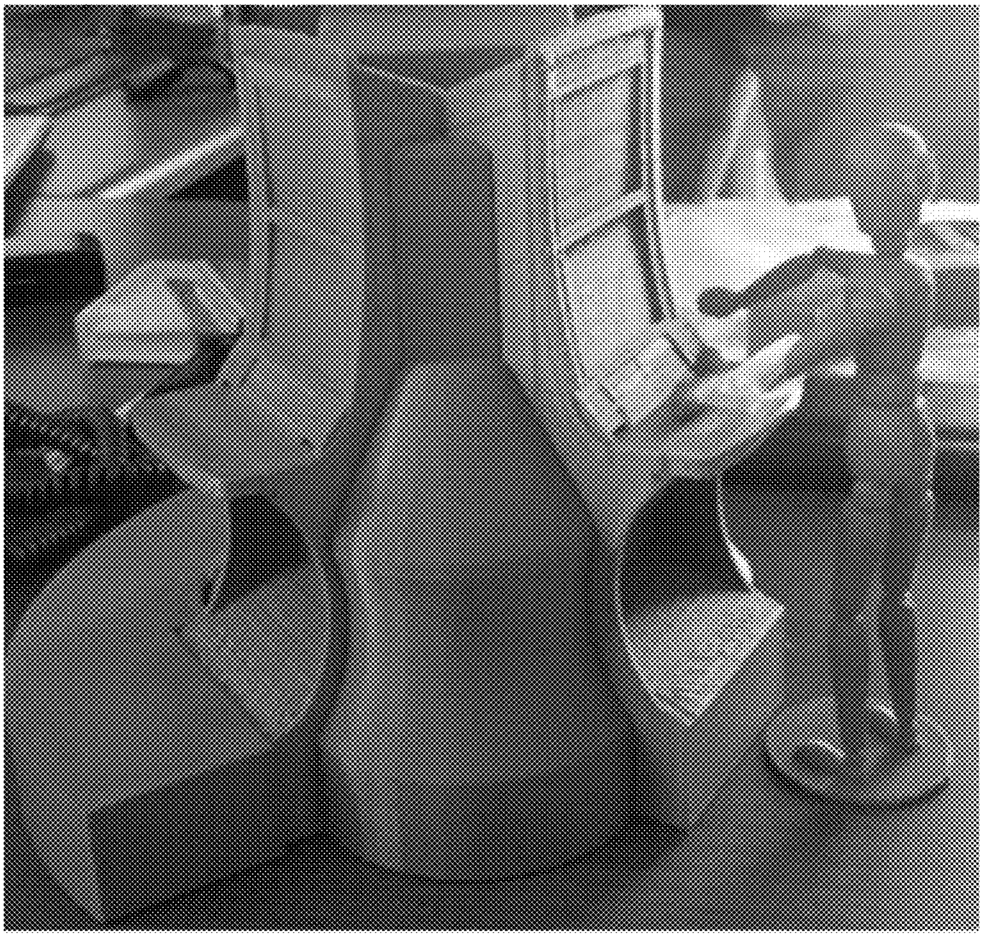
FIG. 21 shows a non-limiting example of a suitable multiple-player gaming machine; in this case, a prototype of Carousel version of gaming machine.

In some embodiments, the Carousel version gaming machine allows multiple players to play single-player games respectively. In some embodiments, the Carousel version gaming machine allows multiple players to play multiple-player games respectively. In some embodiments, the Carousel version gaming machine allows multiple players to play within the same multiple-player environment. In further embodiments, the Carousel version gaming machine allows multiple players playing in the same game environment to play head-to-head against each other. In further embodiments, the Carousel version gaming machine allows multiple players playing in the same game environment to play at the same time but not against each other. Referring to FIG. 21, in a particular embodiment, a prototype Carousel version gaming machine is provided to allow multiple players to play and gamble with game sessions.

Figure 22:
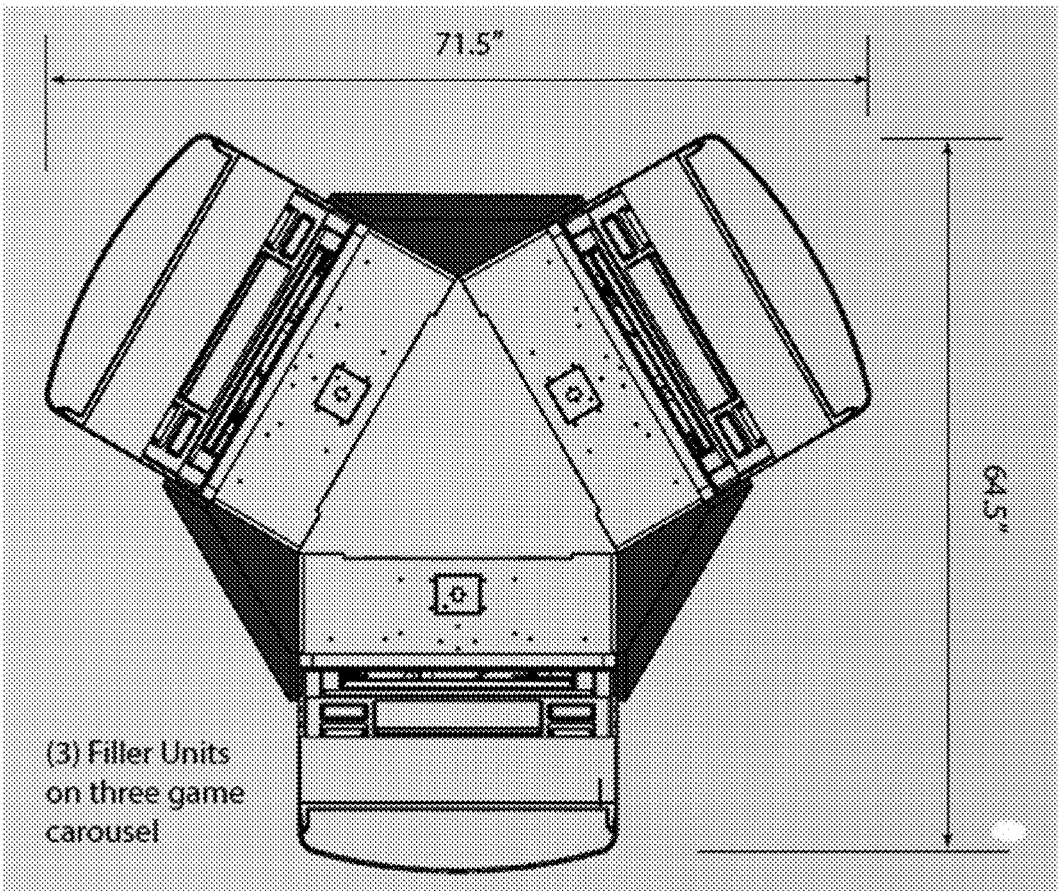
FIG. 22 shows a non-limiting example of a design of a Carousel version gaming machine; in this case, a top view of a 3-unit pod Carousel version gaming machine.
Figure 23:
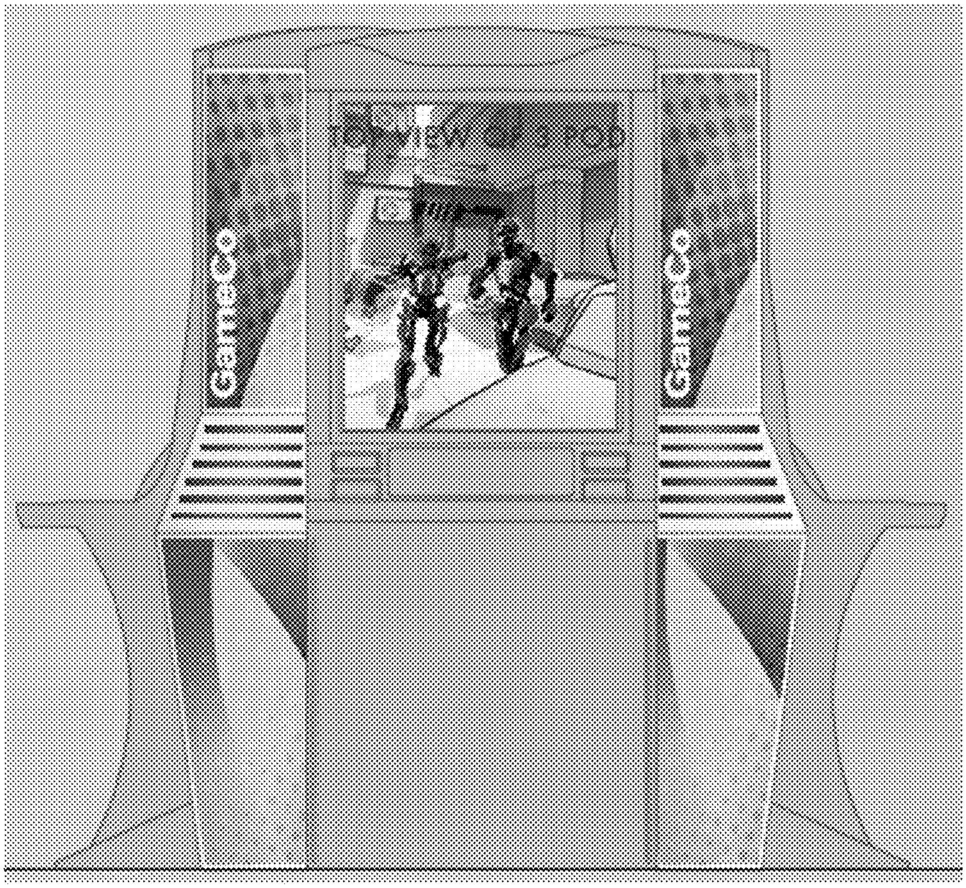
FIG. 23 shows a non-limiting example of a design of a Carousel version gaming machine; in this case, a side view of a 3-unit pod Carousel version gaming machine.
Figure 24:
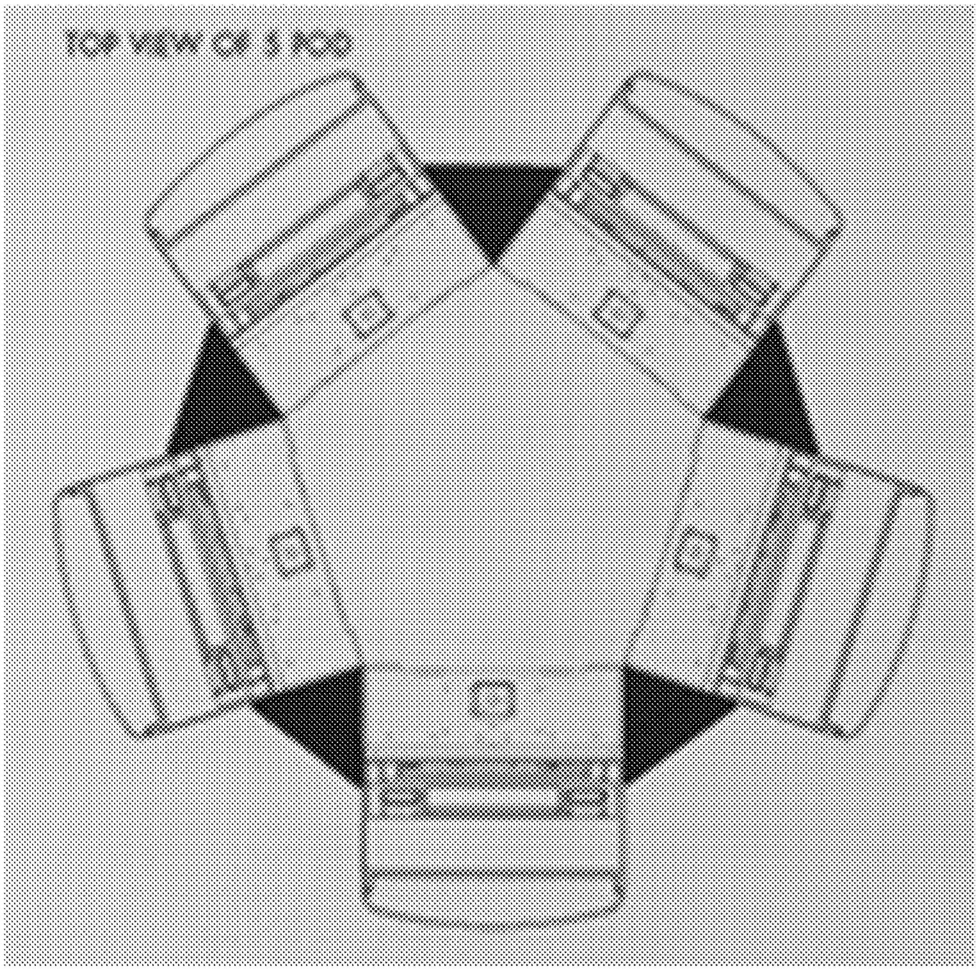
FIG. 24 shows a non-limiting example of a design of a Carousel version gaming machine; in this case, a top view of a 5-unit pod Carousel version gaming machine.
Figure 25:
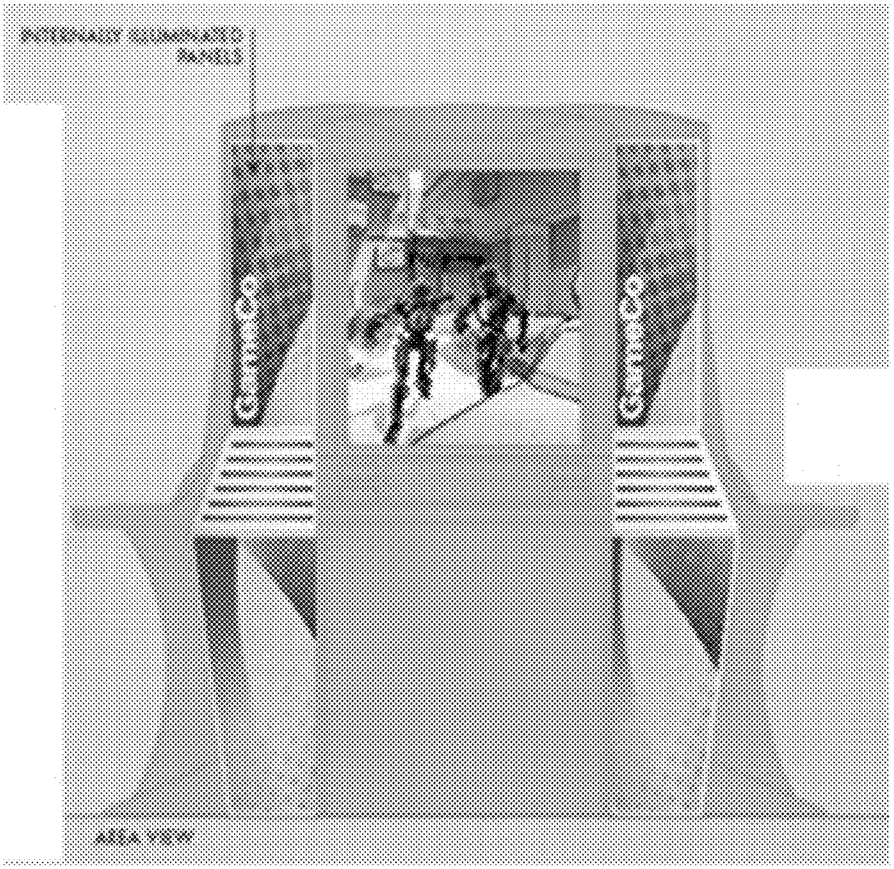
FIG. 25 shows a non-limiting example of a design of a Carousel version gaming machine; in this case, a side view of a 5-unit pod Carousel version gaming machine.

In some embodiments, the Carousel version gaming machine comprises a 3-unit carousel pod. In some embodiments, the Carousel version gaming machine comprises a 5-unit carousel pod. In various embodiments, the Carousel version gaming machine comprises 2, 4, 6, 7, 8, 9, 10-unit carousel pods. Referring to FIGS. 22-23, in a particular embodiment, a 3-unit pod Carousel version gaming machine is displayed with its top-view and side view. Referring to FIGS. 24-25, in a particular embodiment, a 5-unit pod Carousel version gaming machine is displayed with its top-view and side view.

Figure 26:
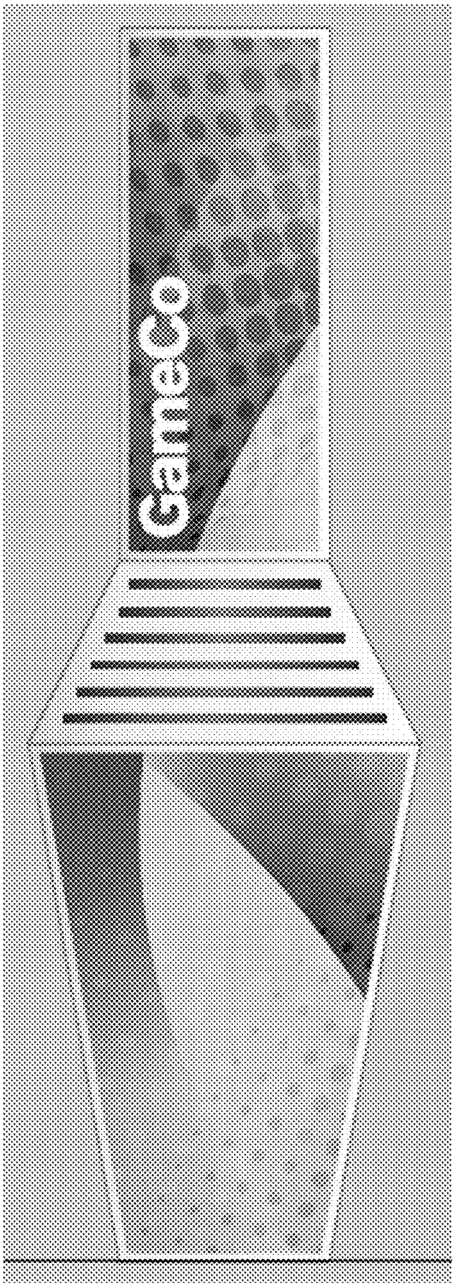
FIG. 26 shows a non-limiting example of a design of a Carousel version gaming machine; in this case, a front view of a filler of a Carousel version gaming machine.
Figure 27:
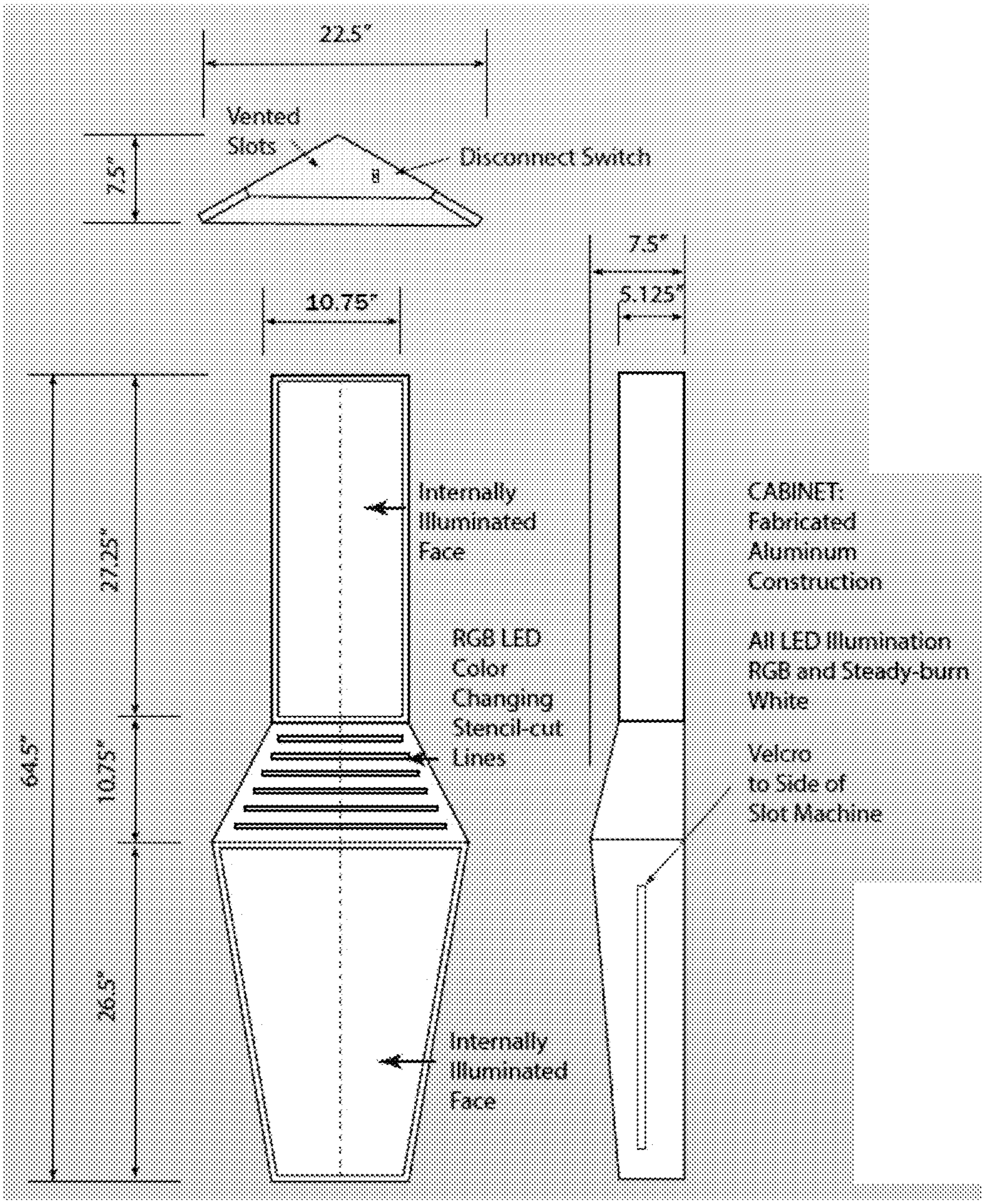
FIG. 27 shows a non-limiting example of a design of a Carousel version gaming machine; in this case, a three-dimensional view and design parameters of a filler of a Carousel version gaming machine.

In some embodiments, the Carousel version gaming machine comprises cabinets, carousels, fillers, and/or spacers. Referring to FIG. 26, in a particular embodiment, a front view of a filler is described for a Carousel version gaming machine. Referring to FIG. 27, in a particular embodiment, a three-dimensional view of the filler is shown and detailed design features and parameters of the filler are described.

Figure 28:
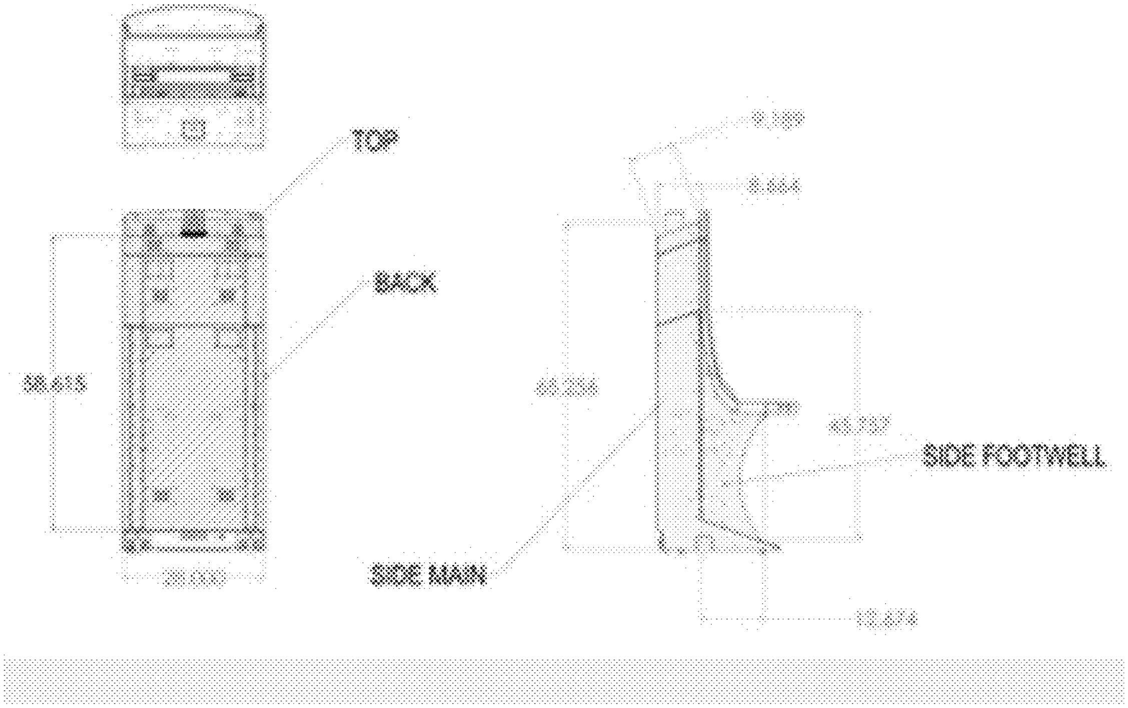
FIG. 28 shows a non-limiting example of a design of a Carousel version gaming machine; in this case, a three-dimensional view and design of an individual cabinet of a Carousel version gaming machine.
Figure 29:
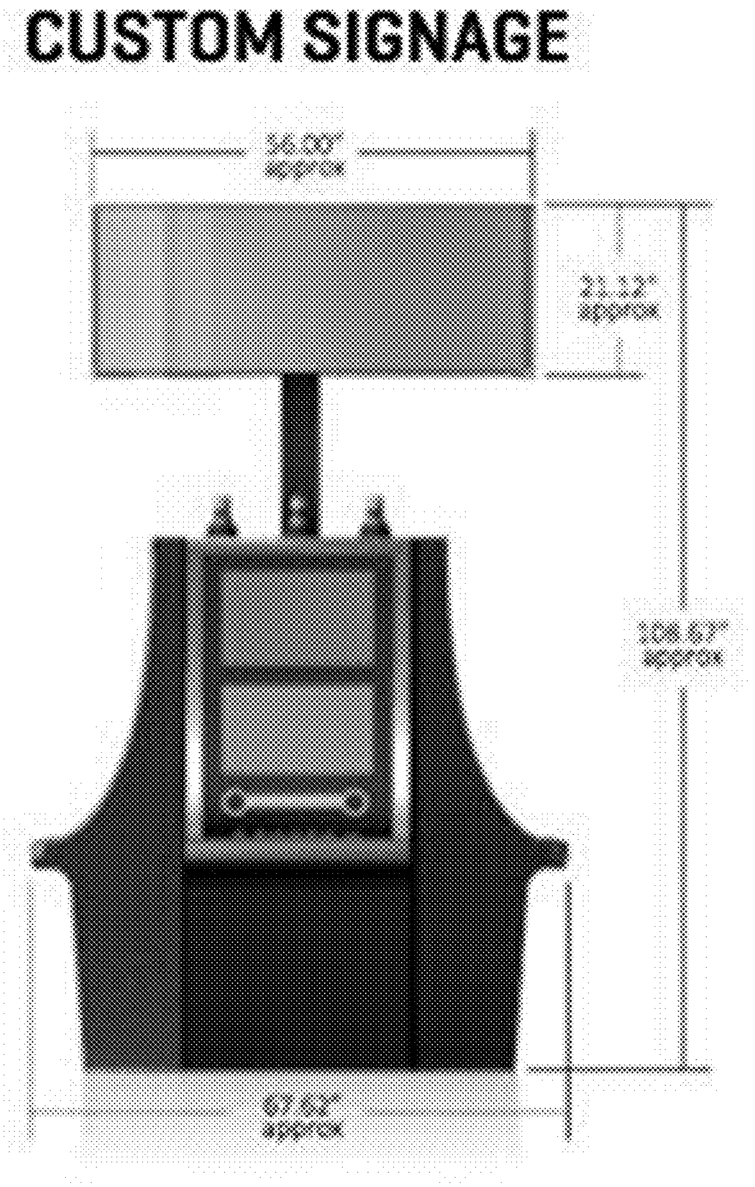
FIG. 29 shows a non-limiting example of a design of a Carousel version gaming machine; in this case, a custom signage of an individual cabinet of a Carousel version gaming machine.

Referring to FIG. 28, in a particular embodiment, a three-dimensional view of an individual cabinet of a Carousel version gaming machine is shown wherein the top, back, side main and side footwell views are all displayed with respective design parameters. Referring to FIG. 29, in a particular embodiment, a custom signage of an individual cabinet of a Carousel version gaming machine is shown to have its particular design parameters.

Non-Transitory Computer Readable Storage Medium

In some embodiments, the methods, systems, and media disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the methods, systems, and media disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the methods, systems, and media disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the methods, systems, and media disclosed herein include one or more databases, or use of the same. In view of the disclosure provided herein, those of skill in the art will recognize that many databases are suitable for storage and retrieval of player and game information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1A

General Rules of a Race Game

A video game gaming machine (VGM) provides players the flexibility of playing/gaming on any popular video games, such as a racing game, a fighting game, a first person shooter (FPS) game, or a massively multiplayer online role-playing game (MMORPG). In one example, a player is playing a race game on a video game gaming machine wherein his payout outcome depends on his best track time.

In this race game, the player is racing on a track to achieve the best time. The player is able to restart at the beginning of the track at any time and has 60 seconds to post the best time. The player receives a payout based on their best time. It is a multiplayer racing game in which each player is represented as a "ghost" to other racers. Players are not able to influence other racers, i.e., knock into other cars. This "single player game in a multiplayer environment" is a critical aspect of the competition and enjoyment in Race Game.

For such a race game, for example, a general rule is that a player has 60.0 seconds to post their optimum track time. The player may make multiple attempts for optimum track time in allowed 60.0 seconds, and the race game stops immediately once the 60.0 seconds timer has expired. In addition, any laps in progress are forfeited. The player's car starts at the track's start line. On commencement, the car moves forward at constant velocity. Then the player gets to control the car using video game controller. The player is able to move forward, move forward/left, or forward/right. Game play ends immediately after 60.0 seconds. Game also ends if player achieves optimum track time that gives him the Maximum Available Payout.

This race game uses a very simple, fixed Paytable with different potential distributions of outcomes. Referring to FIG. 3, in a particular embodiment, this race game uses a very simple, fixed Paytable with five (5) potential Payout Levels. Each payout is defined based on the minimum time the player must score to receive the corresponding award. For example, a player achieves a payout of 3.0 (based on wager of 1 credit) when he finishes the track on or below 14.00 seconds. In turn, he gets paid 2 credits when his best track time is between 14.01 and 14.05 seconds. He gets paid nothing if he finishes the track in more than 14.20 seconds or he doesn't finish the track within the set time (60.0 seconds in this case).

Example 1B

Track Creation and Choosing of a Race Game

When a player plays this race game, he is presented a race track randomly chosen from a huge pool of race maps and tracks. In addition, the creation of tracks and choice of a track are done to reflect the optimum path length, optimum track time and different needs of Return To Player payout percentage.

Each race takes places on a track created using a design, filter, and test methodology. Tracks are designed from a defined pool of elements or symbols. Each track is designed such that the optimum path length and finish time of each total assembly of track symbols is within the range for each track distribution. Track assemblies are algorithmically tested and filtered to remove tracks that do not exactly conform to the specified optimum path lengths. Track assemblies that pass the automated testing/filtering will then be tested qualitatively by humans. Ultimately, all included tracks will correspond to the five Payout Levels noted in the Paytable above.

Regardless of the track, the Paytable will remain fixed. Although every map will be created so that the player feels as if they're able to achieve the top prize, sometimes it is not possible for the player to achieve every outcome for any particular map. Importantly, every track will be designed to afford the player the best possible chance of racing the optimum track time and receiving the top payout for that given track. The actual balance of track outcomes will be defined by the Return To Player for that particular game and driven by a random number generator.

Race Game utilizes an industry-standard random number generator (RNG) to randomly choose the track for each race. In some embodiments, a first random number is used to choose the Payout Level. This will determine the Maximum Available Payout for the given game session if the player is able to achieve the optimum finish time on the specific track. A second random number is used to choose the specific map from the group of maps with the designated Payout Level. Race Game contains a very large total number of tracks such that any player is highly unlikely to repeat the same track ever.

Example 1C

Managing Return to Player in a Race Game

This race Game includes a fixed Paytable in an effort to provide a clear and concise goal for all players. Irrespective of the track in which a player is racing they will always be awarded the same prize for finishing within the same time distribution. As the eRTP (expected Return To Player) percentage must be based on optimum play it must be said that not every track will allow players to finish in the top prize distribution. In fact, some tracks must ensure players finish outside of any prize distributions. These tracks are said to be unbeatable.

Referring to FIG. 4, in a particular embodiment, a table is provided to provide a 75% eRTP based on a game Paytable for a race game. For this race game, Return To Player is calculated as the sum of the multiplication of the payout of each distribution line and the chance of the appearance of each distribution line.

Track Group/Distribution 1—the Best Possible Time on this Track ≤14.00

Chance Weighting=5%/Optimum Finish Time ≤14.00

Players will receive a Track Group/Distribution 1 track 5% of the time. The optimum finish time for this distribution is ≤14.00, resulting in a payout of 3. Players may potentially receive the payout for distributions 1, 2, 3, 4, or 5 depending on their actual results.

Track Group/Distribution 2—the Best Possible Time on this Track is 14.01

Chance Weighting=10%/Optimum Finish Time >14.01 & ≤14.05

Players will receive a Track Group/Distribution 2 track 10% of the time. The optimum finish time for this distribution is between 14.01 and 14.05, resulting in a payout of 2. Players may potentially receive the payout for distributions 2, 3, 4, or 5, depending on their actual results.

Track Group/Distribution 3—the Best Possible Time on this Track is 14.05

Chance Weighting=25%/Optimum Finish Time >14.05 & ≤14.10

Players will receive a Track Group/Distribution 3 track 25% of the time. The optimum finish time for this distribution is between 14.05 and 14.10, resulting in a payout of 1. Players may potentially receive the payout for distributions 3, 4, or 5, depending on their actual results.

Track Group/Distribution 4—the Best Possible Time on this Track is 14.11

Chance Weighting=30%/Optimum Finish Time >14.10 & ≤14.20

Players will receive a Track Group/Distribution 4 track 30% of the time. The optimum finish time for this distribution is between 14.11 and 14.20, resulting in a payout of 0.5. Players may potentially receive the payout for distributions 4 or 5 only, depending on their actual results.

Track Group/Distribution 5—the Best Possible Time on this Track is >14.20

Chance Weighting=30%/Optimum Finish Time >14.20

Players will receive a Track Group/Distribution 5 track 30% of the time. The optimum finish time for this distribution is above 14.20, resulting in a payout of 0. Players may only receive the payout for distribution 5, i.e., 25% of tracks will result in zero payout.

Therefore, the eRTP of the distribution table in this FIG. 4 is calculated as =3*5%+2*10%+1*25%+0.5*30%+0*30%=75%.

Figure 6:
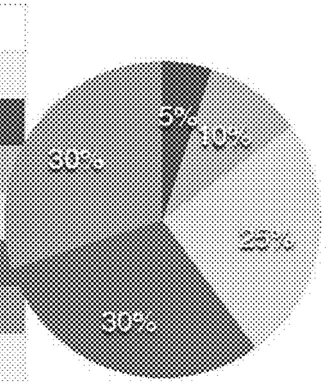
FIG. 6 shows a non-limiting example of an eRTP (expected Return To Player) table; in this case, a table which provides a 75% eRTP by adjusting the weighted chances of track groups with different optimum finish time.
Figure 7:
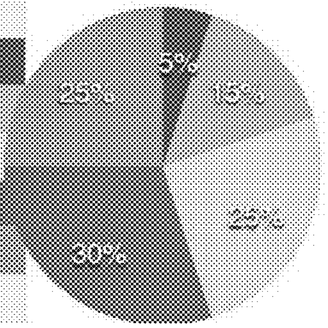
FIG. 7 shows a non-limiting example of an eRTP (expected Return To Player) table; in this case, a table which provides an 85% eRTP by adjusting the weighted chances of track groups with different optimum finish time.
Figure 8:
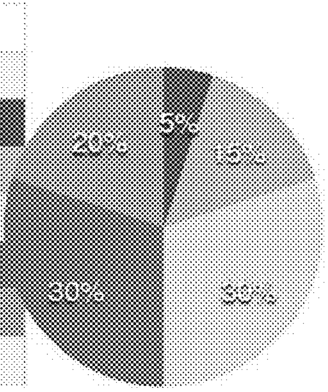
FIG. 8 shows a non-limiting example of an eRTP (expected Return To Player) table; in this case, a table which provides a 90% eRTP by adjusting the weighted chances of track groups with different optimum finish time.

Furthermore, referring to FIGS. 6-8, in particular embodiments, tables with 75%, 85% & 90% eRTP are respectively provided by adjusting the appearing chances of track groups with different optimum finish time. Accordingly, other eRTP is achieved using the equation with different combination of track groups and their appearing chances.

Example 1D

Theoretical Model of a Race Game

The math model in this race game includes a fixed Paytable providing a clear and concise goal for all players. Irrespective of the track in which a player is racing they are awarded the same prize for finishing within the same time distribution.

As the eRTP (expected Return To Player) percentage must be based on optimal play, not every track allows players to achieve the Maximum Available Payout. Some tracks provide no opportunity for the player to earn any payout. These tracks are said to be unbeatable. Player perception and experience is managed across all track types. A player feels the top payout is achievable through optimal play. Using a combination of tracks of varying difficulty, player skill, and random bonuses, the math model manages the game outcome and the optimal Return To Player.

Referring to FIG. 5, in a particular embodiment, a math model of a race game is described wherein a diagram displays a player's payout outcome based on his actual finish time while playing in different track groups of race games. This game design (specifically the weightings for eRTP) relies on the concept of optimum play. In short, optimum play specifies that eRTP be calculated assuming the player performs optimally and therefore receives the Maximum Available Payout while playing each game.

In the case of this race game, the requirement for optimum play means that eRTP must be calculated assuming a player achieves the optimum finish time for each track. For example, if the player randomly receives a Track Group/Distribution 1 track, eRTP is calculated based on an optimum finish time ≤14.00 and a payout of 3. And if the player randomly receives a Track Group/Distribution 2 track, eRTP is calculated based on an optimum finish time ≤14.05 and a payout of 2. Not every track allows players to finish in the top payout. In fact Track Group/Distribution 5 tracks ensure players finish outside of any and receive zero payout.

Not every track allows the player to achieve the Maximum Available Payout. But the game is designed to help the player receive the Maximum Available Payout possible for each track. This is a radical shift in game design for both slot machines and video games. This math model allows players to win the Maximum Available Payout possible. Tracks are designed to balance the challenge of competition with the rush of winning. Players win much more often than a traditional reel slot machine.

Example 1E

Proving Optimum Finish Time in a Race Game

In a race game, there is an optimum path on a racetrack. This is the best possible "line" the driver and car can navigate given the physics of the world and the skill of the driver. This optimum path can be computed using pathfinding algorithms such as Dijkstra's Algorithm and the A* Algorithm.

The race game engineers a software simulator to prove the theoretical and mathematical models outlined above. This software simulator is designed to visualize tracks and outcomes as described for the race Game. The software is an implementation of a shortest path algorithm, specifically tailored to using graphs created from state-transition tables. The software applies a path finding algorithm to determine optimum play in a game.

In the simplest sense, referring to FIG. 9, each segment of a track can be converted into spots or cells whereby each cell takes one (1) second to traverse. The following table outlines the basic elements of a track including; Start, Finish, Straight, Left Corner, and Right Corner.

Furthermore, referring to FIGS. 10-14, in particular embodiments, these tables outline examples of theoretical tracks in Distributions 1-5, respectively. Each table represents a single complete and unique playable track in the game. The name of the track is a user defined label to help identify the track. The distribution name is the distribution range the track is a subset of and is determined by the tracks optimal time value. The optimal time is calculated based on the configuration of track elements which are arrayed in sequence, from the starting element "S" to the finish element "F," to form the actual design of the track. The shortest path algorithm used is in parallel with the software simulator.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Example 2A

General Mechanics of a First Person Shooter (FPS) Game

In another example not illustrated, a player tries to control the path of a virtual projectile so that a designated number of targets is each hit by a projectile a designated number of times. In some embodiments, a given target only requires a single hit in order to count towards the Key Scores. In some other embodiments, a given target requires two or more hits in order to counts towards the Key Scores. In some embodiments, different targets have different minimum hits required. In certain variation, the number of hits required for a given target is known to the player. In certain variations, the number of hits required for a given target is unknown to the player. In some embodiments, all targets appear the same. In some embodiments, all targets have the same general appearance except for size and possibly lighting, in order to imply varying distance from the player. In come embodiments, a first target has a significantly different appearance from a second target. In some embodiments, no target changes position relative to the background. In some embodiments, at least one target changes position relative to the background.

In some embodiments, the point of view of the player does not change during the play of the game. In some embodiments, the player is able to pan their point of view horizontally and/or vertically. In some embodiments, the player is able to laterally shift their point of view typically along the x-axis of the same z-plane. In some embodiments, the player is able to shift their point of view in two or more axis of movement, such as being able to move their position within a virtual 3d target field. In some embodiments, the view from a specific position does not vary. In some other embodiments, a first view from a specific position is different from a second view from the same position. In some variations, this is due to the simulation of viewing though a telescopic device. In some such telescopic view simulations, there is only one magnification available. In some other such telescopic view simulations, there is more than one magnification available. In some embodiments, a first view is association with the selection of a first projectile, while a second view is associated with selection of a second projectile. For example, the view displayed when a virtual sniper rifle is the selected as the source of the next projectile is different from the view displayed with a virtual rocket launcher is selected as the source of the next projectile.

In some embodiments, there are no obstructions between the source of the projectile and all available targets. Is some embodiments, a first target may partially or completely block the view of a second target. In some embodiments, other visual elements in the game may partially or completely block the view of a target which is otherwise located within the confines of the visible play field. In some variations, changes in the player's view, whether by panning and/or by shifting position, change the visibility of targets within the confines of the visible play field.

In some embodiments the player has a limited number of projectiles. In some other embodiments, the player has an unlimited number of projectiles. In some embodiments, the player can only fire or launch a projectile if it is guaranteed to hit a target. In some embodiments, the player can fire or launch a projectile which does not hit any designated targets. In some embodiments, all projectiles have the same characteristics. In some other embodiments, a first projectile has at least one characteristic different from a second projectile available in the game. For example, a first projectile can score a different hit count on a given target than a second projectile. In some variations, the quantity and ordering of first projectiles and second projectiles is the same from game to game. In some other variations, the quantity and/or ordering of first projectiles and second projects is not guaranteed to be the same from game to game. In some variations, the player can select whether to fire or launch a first projectile or a second projectile. In some other variations, the player has no control on the selection of projectiles.

In some embodiments, there is no significant time delay between the player initiating the firing or launching of a projectile and the corresponding effect, whether that be a target hit or target miss. In some embodiments, there is a significant enough time delay between the player initiating the firing or launching of a projectile and the corresponding effect, whether that be a target hit or target miss, that the motion of target relative to the view, whether due to a target changing position relative to the background, or the view changing relative to the background, or both, can affect whether or not a hit is attained. In some embodiments with projectile travel delays, all projectiles travel at the same speed. In some embodiments with projectile delays, a first projectile travels at a first speed while a second projectile travels at a second speed.

In some embodiments, projectiles always travel an idealized straight path. In some embodiments, projectiles travel in a non-linear path such as a parabolic path to simulate the effect of gravity, or such as a complex path to simulate the effects of gravity and friction. In some embodiments, projectiles never experience changes in path due to simulated wind or other environmental factors. In some embodiments, simulated wind or other environmental factors affect the positioning of a projectile's path. For example, a simulated cross wind which produces a windage effect on the point of projectile input. In some embodiments, simulated wind or other environmental factors affect the length of the projectile's path. For example, a simulated head wind which slows a projectile or a simulated tail win that speeds up a projectile. In some embodiments, the designated point of aim only changes based on player input. In some other embodiments, the designated point of aim changes without player input, such as to simulate real-world wobble of the aiming device.

Example 2B

Shooting Ducks Arcade Example

Player is given 30 seconds to knock down as many moving ducks as possible. There are three different sized targets. The smallest target awards 5 points, the medium-size target award 4 points and the largest target awards 3 points when hit. The largest target requires 2 hits anywhere on the target to knock down. The medium size target is knocked down with a single hit, but only if the hit occurs on a bullseye marked portion of the medium-sized target. The smallest target is knocked down with a single hit anywhere.

The type and number of moving targets varies per target field. Also varying are the size and number of blocking elements, namely pig targets and cow targets that only serve as projectile blockers.

The player manipulates X-Y controls to move an onscreen rifle-scope reticle icon which indicates point of aim, and presses a different control to shoot. If the reticle is not aligned with a target at the instant the shot is initiated, then the shot is a miss. Panning and position shifting are not available.

At the end of play, if the player has attained a certain number of points or higher, the player wins a payout defined by the Paytable.

Example 2C

3d Shooter Example

Player is given 30 seconds to knock down as many enemy figures as possible. There are six different looking enemy figures that can appear. The number of hits required for a given enemy figure is randomly selected when the enemy figure is initialized relative to a weighted table of hit thresholds for that type of enemy figure.

The type, number, arrival and positioning of enemy figures varies per target field. This includes the number of enemy figures present within any particular area of the play field and the timing of the appearance of enemy figures.

The player manipulates X-Y controls to move an onscreen rifle-scope reticle icon which indicates point of aim, and presses a different control to shoot. The potential target area is much wider than is shown at any one time. The player manipulates a left-right control to shift the view position accordingly. View shifting also changes parallax between mid-ground elements and targets such that a given target may not be fully visible at every screen position, At the end of play, if the player has attained a certain number of downed enemy targets or higher, the player wins a payout defined by the Paytable.

Example 2D

Target Field Selection

When a player plays a first person shooter game, a pre-created target field is randomly selected. Each such target field has an optimal way of scoring as many hits as possible for the given set of targets, blockers and their relative positioning.

Each target field is created using a design, filter, and test methodology. Target fields are designed from a defined pool of elements or symbols. Each target field is designed such that the optimum targeting behavior is within the required range Target field are algorithmically tested and filtered to remove tracks that do not exactly conform to the specified optimal hit results. Target field that passes the automated testing/filtering will then be tested qualitatively by humans.

Regardless of the target field, the Paytable will remain fixed. Although every target field will be created so that the player feels as if they're able to achieve the top prize, sometimes it is not possible for the player to achieve every outcome for any particular target field.

Example 2E

Managing Return to Player

A player who plays perfectly will obtain the highest Key Score available within each target field, which does not always correspond to the Key Score required to win the top award listed in the Paytable. Therefore, the weighted distribution of the selection of target fields is constructed to generate the desired long term expected eRTP.

eRTP(total)=maxPayout(targetField1)*probability(targetField1Selection)+maxPayout(targetField2)*probability(targetField2Selection)+ . . . +maxPayout(targetFieldN)*probability(targetFieldNSelection)

Many players will make mistakes and sub-optimal choices significant enough to prevent them from earning the highest winnable prize for the given target field. In order to keep lower-skill players from losing too much RTP, additional sources of payout which are based on player's lack of skill are incorporated into the game.

In some embodiments, a player is occasionally awarded additional payouts relative to his/her actual Key Score within a game at one or more specific times. For example, in the Duck Shooting sample game, actual Key Score would be the points acquired at the time of checking. For the 3D Shooter sample game, actual Key Score would be the number of enemy figures downed at the time of checking. In some embodiments, a player is occasionally awarded additional payouts relative to his/her actual progress within a game at one or more specific times. For example, in the Duck Shooting sample game, actual progress would be determined based on the number of points earned and the number of large-targets with one of the two required hits. For the 3D Shooter sample game, actual Key Score would be based on the number of enemy figures downed and the number of hits scored on still-standing enemy figures at the time of checking. In some embodiments, a player is occasionally awarded additional payouts relative to his/her ancillary progress within a game at one or more specific times, where said ancillary progress had a high correlation to skillful play. For example, for the 3D shooter sample game, ancillary progress could include: (a) number of total hits; or (b) average time between shots on the same target; or (c) average time between downing on target and placing first hit on a different target; or the number of missed shots between the first shot that hits a given target and the last shot that downs same said target; or (d) any suitable metric.

What is claimed is:

1. A computer-implemented method of adapting games of skill into a gaming machine, wherein the method balances player skill, game challenges, and random elements to map a probable series of outcomes for all players, the method comprising:

a. accepting, through the gaming machine, initiation of play by a player;
b. providing, by the gaming machine, one or more single-player games associated with a plurality of game parameters and having one or more features requiring the application of video game skill by the player during game play thereof, wherein the games are chosen from a Playfield Selection Pool using a random number generator, comprising:
   i) a first random number used to choose a Playfield from the Playfield Selection Pool, wherein the Playfield is set to have a Maximum Available Payout; and
   ii) a second random number used to choose a specific game session from the already chosen Playfield;
c. evaluating and recording, by the gaming machine, the results of the play of the said game session in the said Playfield;
d. presenting, by the gaming machine, a Paytable to the player, wherein the Paytable comprises one or more lines of payouts corresponding to play results;
e. evaluating and distributing, by the gaming machine, any payout earned according to the best play results and the Paytable; and
f. managing, through the gaming machine, the variance of Return To Player (RTP) of the Paytable, by adjusting selection weights of different Playfields presented to a player, wherein different Playfields relate to respective Maximum Available Payouts.

2. The method of claim 1, wherein the player plays the game via a game controller.

3. The method of claim 2, wherein the game controller comprises one or more of: a gamepad, a paddle, a joystick, a trackball, a throttle quadrant, a steering wheel, a yoke, pedals, a keyboard, a mouse, a touch screen, a motion sensor, a light gun, a rhythm game controller, a console game controller.

4. The method of claim 1, wherein the gaming machine accepts initiation by two or more players, provides two or more single-player game sessions, evaluates and records the results of the play of two or more game session, and evaluates and distributes respective payouts to the two or more players.

5. The method of claim 1, wherein the managing of the Return To Player variance is based on one or more of: mid-game metrics, Key Scores, non-Key Scores, end-of-game results, the difference between actual Maximum Available Payouts and actual payouts, and the difference between actual Maximum Attainable Key Scores and actual Key Scores.

6. The method of claim 1, wherein the Return To Player variance is managed by adjusting one or more of: selection weights of at least one a first prize from a first variable-prize selection pool, the frequency of a bonus award, the amount of time available within a Play Session, and the number of player actions available with a Play Session.

7. The method of claim 1, wherein the adjusting of the Return To Player is applied to one or more of: a current game in progress and a future game.

8. The method of claim 1 wherein the gaming machine is a stand-alone unit.

9. The method of claim 1 wherein the gaming machine is connected to a central server system from which random results are generated and communicated to the gaming machine.

10. The method of claim 1 wherein the Maximum Available Payout is based upon the Maximum Attainable Key Score associated with each Playfield.

11. The method of claim 1 wherein the games in the Playfield Selection Pool comprise one or more games with a time limit.

12. The method of claim 11, wherein the games comprise a racing game, wherein a player races on a track to achieve the best track time within a given timeframe.

13. The method of claim 12, wherein the racing game comprises an optimum path on the racetrack and an optimum track time along the optimum path.

14. The method of claim 1 wherein the games in the Playfield Selection Pool include at least one game with a limit on the number of player actions allowed during game play.

15. The method of claim 1 wherein the games in the Playfield Selection Pool include at least one game with at least one strategic skill decision required of the player.

16. The method of claim 1, wherein the games comprise one or more of: a maze game, a sports game, a spelling game, a catching game, an avoiding game, a balancing game, a drawing game, a collecting game, a shooting game, an exercise-based game, a role playing game, a casual game, a racing game, a fighting game, a first person shooting game, a massively multiplayer online role-playing game (MMORPG), a side view projectile game, a top view projectile game, quartering view projectile game, or a massively multiplayer online role-playing game, a matching game, a hidden object game, a word finding game, a word construction game, a path game, a time-management game, a resource management game, a plant growing game, an animal raising game, a shape placing game, a pattern matching game, a rhythm matching game, a memory game, a color completion game, a linking game, a virtual fishing game, an animal simulation game, and any suitable game of skill.

17. The method of claim 1, wherein the gaming machine is configured to accept a player's bet that a play result will be achieved during the game session.

18. The method of claim 1, wherein the player makes extra bets during the game based on the progress of the game.

19. The method of claim 1, wherein the player is provided with a single chance to achieve a specific Key Score during a game session.

20. The method of claim 1 wherein the gaming machine awards the player additional time to complete the game session.

21. The method of claim 20, wherein said additional time awarded is based upon the gaming machine determining, via evaluation of mid-game progress, that the probability that the player earns less than the Maximum Available Payout without said additional time is greater than a preset probability.

22. The method of claim 1, wherein the player plays in a practice mode with a small price without betting or returns.

23. A computer-implemented system for adapting games of skill into a gaming machine by balancing player skill, game challenges, and random elements to map a probable series of outcomes for all players, the system comprising:

a. a gaming machine comprising at least one processor, an operating system configured to perform executable instructions, and a memory;

b. a computer program including instructions executable by the at least one processor to create an application comprising:

i) a software module configured to accept initiation of play by a player;

ii) a software module configured to provide one or more single-player games associated with a plurality of game parameters and having one or more features requiring the application of video game skill by the player during game play thereof, wherein the games are chosen from a Playfield Selection Pool using a random number generator, comprising:

(A) a first random number used to choose a Playfield from the Playfield Selection Pool, wherein the Playfield is set to have a Maximum Available Payout; and (B) a second random number used to choose a specific game session from the already chosen Playfield;

iii) a software module configured to evaluate and record the results of the play of the said game session in the said Playfield;

iv) a software module configured to present a Paytable to the player, wherein the Paytable comprises one or more lines of payouts based on a player's play results;

v) a software module configured to evaluate and distribute any payout earned according to the best play results and the Paytable; and vi) a software module configured to manage the variance of Return To Player (RTP) of the Paytable, by adjusting selection weights of different Playfields presented to a player, wherein different Playfields relate to respective Maximum Available Payouts.

24. Non-transitory computer-readable storage media encoded with a computer program including instructions executable by a processor to create an application for adapting games of skill into a gaming machine by balancing player skill, game challenges, and random elements to map a probable series of outcomes for all players, the application comprising:

a. a software module configured to accept initiation of play by a player;

b. a software module configured to provide one or more single-player games associated with a plurality of game parameters and having one or more features requiring the application of video game skill by the player during game play thereof, wherein the games are chosen from a Playfield Selection Pool using a random number generator, comprising:

i) a first random number used to choose a Playfield from the Playfield Selection Pool, wherein the Playfield is set to have a Maximum Available Payout; and ii) a second random number used to choose a specific game session from the already chosen Playfield;

c. a software module configured to evaluate and record the results of the play of the said game session in the said Playfield;

d. a software module configured to present a Paytable to the player, wherein the Paytable comprises one or more lines of payouts based on a player's play results;

e. a software module configured to evaluate and distribute any payout earned according to the best play results and the Paytable; and f. a software module configured to manage the variance of Return To Player (RTP) of the Paytable, by adjusting selection weights of different Playfields presented to a player, wherein different Playfields relate to respective Maximum Available Payouts.

* * * * *